US008929708B2

(12) United States Patent
Pimentel et al.

(10) Patent No.: US 8,929,708 B2
(45) Date of Patent: Jan. 6, 2015

(54) FIBER ORGANIZER AND DISTRIBUTION BOX

(75) Inventors: Nelson Goncalves Pimentel, Neuss (DE); Norbert Gaertner, Wuppertal (DE); Matthias Fehrenz, Hagen (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/883,139

(22) PCT Filed: Nov. 8, 2011

(86) PCT No.: PCT/US2011/059773
§ 371 (c)(1),
(2), (4) Date: May 2, 2013

(87) PCT Pub. No.: WO2012/074688
PCT Pub. Date: Jun. 7, 2012

(65) Prior Publication Data
US 2013/0243386 A1 Sep. 19, 2013

Related U.S. Application Data

(60) Provisional application No. 61/418,469, filed on Dec. 1, 2010, provisional application No. 61/529,040, filed on Aug. 30, 2011.

(51) Int. Cl.
*G02B 6/00* (2006.01)
*G02B 6/44* (2006.01)
(52) U.S. Cl.
CPC ............ *G02B 6/4401* (2013.01); *G02B 6/4441* (2013.01); *G02B 6/445* (2013.01); *G02B 6/4454* (2013.01); *G02B 6/4477* (2013.01)
USPC ........................................................ 385/135
(58) Field of Classification Search
CPC .... G02B 6/4446; G02B 6/445; G02B 6/4453; G02B 6/4454; G02B 6/4455

USPC ........................................................... 385/135
See application file for complete search history.

(56) References Cited

U.S. PATENT DOCUMENTS 4,971,421 A    11/1990   Ori
5,870,519 A *  2/1999   Jenkins et al. ................ 385/135
(Continued)

FOREIGN PATENT DOCUMENTS

DE    20 2007 000556 U    10/2007
WO    WO 2010/039435       4/2010
(Continued)

OTHER PUBLICATIONS

International Search Report for PCT/US2011/059773, mailed Jun. 5, 2012, 12 pp.

*Primary Examiner* — Ryan Lepisto
(74) *Attorney, Agent, or Firm* — Kristofor L. Storvick

(57) ABSTRACT

An organizer (100) for fiber cable management comprises a generally planar base (105) having a splitter holding section (110), a slack and unterminated fiber storage section (120), and a splice and splice tray holding section (150). The splitter holding section (110) is configured to optionally hold one or more fiber splitters. The slack and unterminated fiber storage section includes a slack storage region (130) having a plurality of fiber routing structures (146a, 146b) to support and retain slack fiber and an unterminated fiber storage region having one or more spool type structures (142) to support and retain unterminated fiber separate from the slack fiber. The splice and splice tray holding section is configured to optionally hold one of a first fiber splice insert (160) and a splice tray holder (170) configured to engage one or more splice trays. A distribution box (200) for distributing optical fibers for communications includes a base, a cover, and the organizer described above.

19 Claims, 31 Drawing Sheets

(56) References Cited

U.S. PATENT DOCUMENTS

| | | |
|---|---|---|
| 6,269,214 B1 | 7/2001 | Naudin |
| 6,915,057 B2 | 7/2005 | Vincent |
| 7,613,377 B2 | 11/2009 | Gonzales |
| 2009/0103879 A1* | 4/2009 | Tang et al. .................... 385/135 |
| 2011/0164854 A1 | 7/2011 | Desard |

FOREIGN PATENT DOCUMENTS

| | | |
|---|---|---|
| WO | WO 2010/051160 | 5/2010 |
| WO | WO 2010/077856 | 7/2010 |
| WO | WO 2012/074684 | 6/2012 |
| WO | WO 2012/074685 | 6/2012 |

* cited by examiner

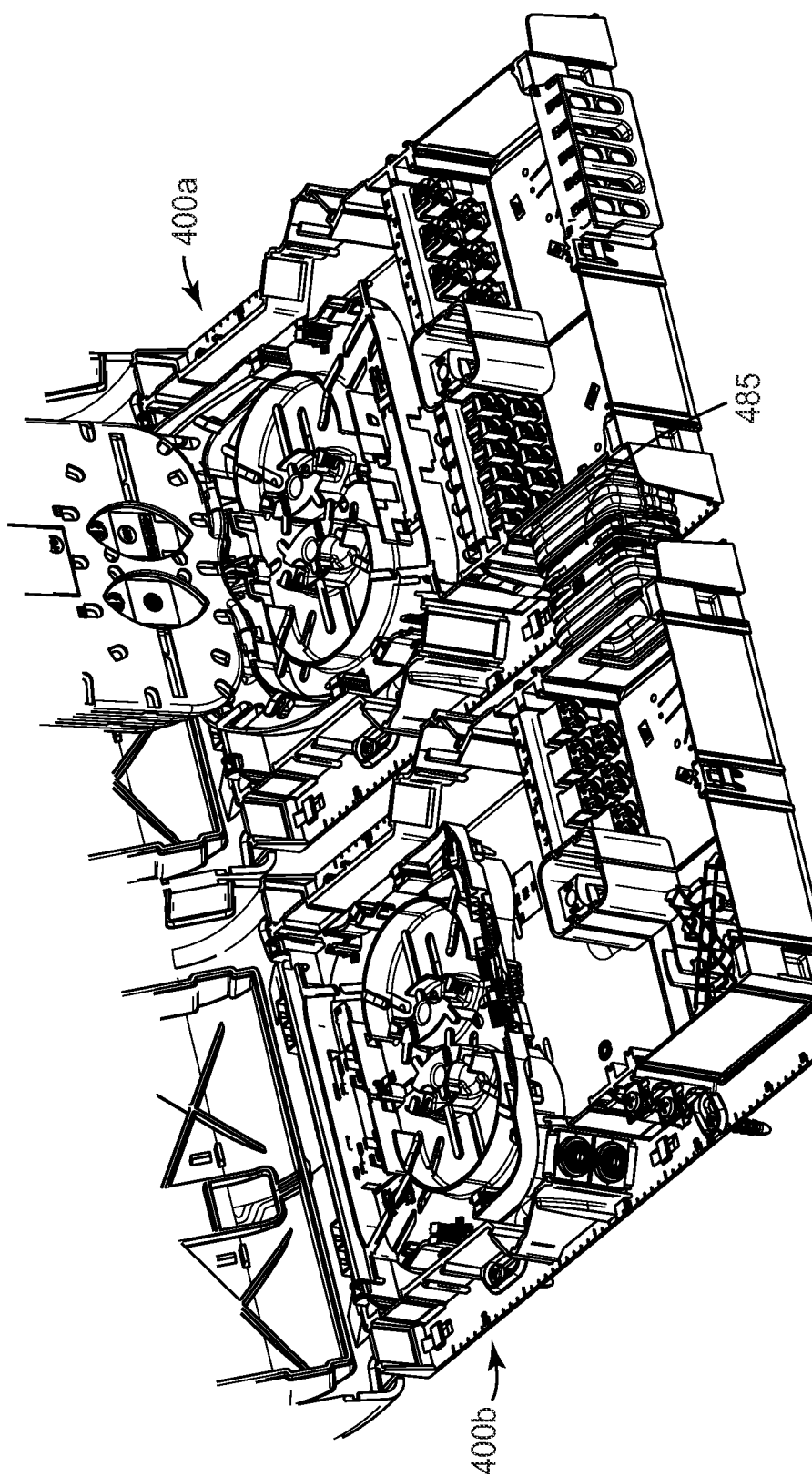

FIBER ORGANIZER AND DISTRIBUTION BOX

THE FIELD OF THE INVENTION

The present invention relates generally to a fiber organizer and box for distributing optical fibers for telecommunications.

BACKGROUND OF THE INVENTION

Telecommunication cables are used for distributing all manner of data across vast networks. A telecommunication cable typically includes a bundle of individual telecommunication lines (either optical fibers or copper wires) that are encased within a protective sheath. As telecommunication cables are routed across data networks, it is necessary to periodically open the cable so that one or more telecommunication lines therein may be spliced, thereby allowing data to be distributed to other cables or "branches" of the telecommunication network. The cable branches may be further distributed until the network reaches individual homes, businesses, offices, premises, and so on.

At each point where a telecommunication cable is opened, some type of closure, box, or enclosure is provided to protect the exposed interior of the cable. Commonly, the closure has one or more ports through which cables enter and/or exit the closure. Once inside the closure, the cable is opened to expose the telecommunication lines therein. Conventional telecommunication boxes are constructed to facilitate the management and protection of individual telecommunication lines and splices thereof.

For some fiber-to-the-x (FTTX) deployments, a service provider typically installs a distribution box (also known as a fiber distribution terminal (FDT)) at the ground floor, on each floor, or every few floors of a multi-dwelling unit (MDU), residence, or business. The FDT connects the building riser cable to the horizontal drop cables which run to each living unit (in the MDU or on a particular floor). Drop cables are spliced to the riser cable in the FDT only as service is requested from a tenant in a living unit. Connecting existing MDUs to the FTTX network can often be difficult. Challenges can include gaining building access, limited distribution space in riser closets, and space for cable routing and management.

Another challenge includes providing for multiple service providers.

SUMMARY

In one exemplary aspect of the invention, an organizer for fiber cable management, comprises a generally planar base having a splitter holding section, a slack and unterminated fiber storage section, and a splice and splice tray holding section. The splitter holding section is configured to optionally hold one or more fiber splitters. The slack and unterminated fiber storage section includes a slack storage region having a plurality of fiber routing structures to support and retain slack fiber and an unterminated fiber storage region having one or more spool type structures to support and retain unterminated fiber separate from the slack fiber. The splice and splice tray holding section is configured to optionally hold one of a first fiber splice insert and a splice tray holder configured to engage one or more splice trays.

In yet another aspect, the unterminated fiber storage region includes a trough formed between an outer wall of the spool-type structures and several inner retention structures. In another aspect, the fiber storage trough is a raised structure, formed above a floor of the organizer.

In yet another aspect, the unterminated fiber storage region includes one or more access slots that permit access to stored fibers from at least one side using a finger or small access tool.

In yet another aspect, the plurality of fiber routing structures comprises two half ring structures that permit slack fiber to be bent at an appropriate bend radius for the fiber, wherein fiber slack is retainable outside of and inside of the half ring structures. In another aspect, the fiber slack storage region further includes a plurality overhanging tabs to retain the fiber slack and prevent displacement of the spooled slack fiber.

In yet another aspect, the splitter holding section includes a plurality of post structures that accommodate a plurality of splitters. In another aspect, the splitter holding section is configured to secure a second fiber splice insert that can support one or more fiber splices.

In yet another aspect, the splice and splice tray holding section is coupled to a fiber ramp deliver fibers and fiber cables. In another aspect, the fiber ramp includes one or more fiber channels disposed on either or both sides of the splice and splice tray holding section, the fiber channels having a deep U-shaped cross section to help prevent individual fibers from crossing over into other channels.

In yet another aspect, the splice and splice tray holding section comprises one or more brackets to removably support the first splice insert, the first splice insert configured to support one or more fusion splices or one or more mechanical splices.

In yet another aspect, the splice and splice tray holding section is gradually elevated from the floor of the organizer. In another aspect, the splice and splice tray holding section retains one or more splice trays in a stacked manner to sit above the slack and unterminated fiber storage section. In another aspect, the splice and splice tray holding section includes a removable tray holder that comprises a multi-loop structure insertable into a slot formed in the splice and splice tray holding section, the multi-loop structure configured to engage one or more rotatable splice trays.

In yet another aspect, the organizer further comprises at least one strain relief element to provide support to and reduce axial strain on one or more fibers routed within the organizer.

In another exemplary aspect of the invention, a box for distributing optical fibers for communications is provided. The box includes a base, a cover, and the organizer described above.

In yet another aspect, the distribution box further comprises a cable support channel formed on a first side of the closure to support an incoming telecommunications cable.

In yet another aspect, the distribution box further comprises an entrance port formed in a side wall of the distribution box.

In yet another aspect, the distribution box further comprises a gas-blocker device mounted to a side wall of the distribution box.

In yet another aspect, the distribution box further comprises a universal strain relief device mounted to the distribution box that secures the strength members (e.g., aramid, glass yarn) of the incoming telecommunications cable.

In yet another aspect, the distribution box further comprises a patch panel to receive plurality of optical fiber connectors.

In yet another aspect, the distribution box further comprises a plurality of strain relief devices arranged in an array on an inner wall of the distribution box.

In yet another aspect, the distribution box further comprises a plurality of removable walls.

In yet another aspect, the cover is rotatably mounted to the base of the distribution box.

In yet another aspect, the distribution box further comprises a storage compartment for the storage of excess components and accessories.

In yet another aspect, the distribution box further comprises a locking structure configured to engage a locking mechanism formed in the cover when the cover is placed in a closed position over the base.

In yet another aspect, the organizer is disposable at more than one location on the base. In another aspect, the organizer is disposable at more than one orientation on the base.

In another aspect of the present invention, a distribution box for distributing one or more telecommunications cables comprises an organizer area comprising an organizer for fiber cable management. The distribution box further includes a patch area for patching cables entering or exiting the distribution box, a cable support channel formed on at least a first side of the distribution box outside the organizer area and the patch area to support an incoming telecommunications cable, a first plurality of removable walls disposed on at least a portion of a perimeter of the distribution box, at least one additional removable wall separating the organizer area from the patch area, and a removable cover to enclose the organizer area and the patch area when the cover is placed in a closed position.

In another aspect, each of the plurality of removable walls has the same dimensions. In a further aspect, a first cable support channel is formed on a first side of the distribution box and a second cable support channel is formed on a second side of the distribution box.

In yet another aspect of the present invention, a universal strain relief device to secure one or more strength members of a telecommunications cable comprises a base structure configured to be disposed in a distribution box. A screw is mounted to the base and is configured to secure one or more aramid fibers to the universal strain relief device. A first groove is formed in an upper surface of the base structure and is configured to receive a metal rod or wire strength member. A moveable plate is pressable against the metal rod or wire strength member via the screw. In addition, a second groove is centrally formed on the base structure and is configured to receive a cable restraint device.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

Embodiments of the invention are better understood with reference to the following drawings. The elements of the drawings are not necessarily to scale relative to each other.

FIGS. 9A-9C are various views of several exemplary distribution boxes linked together according to another aspect of the invention.

Figure 1A:
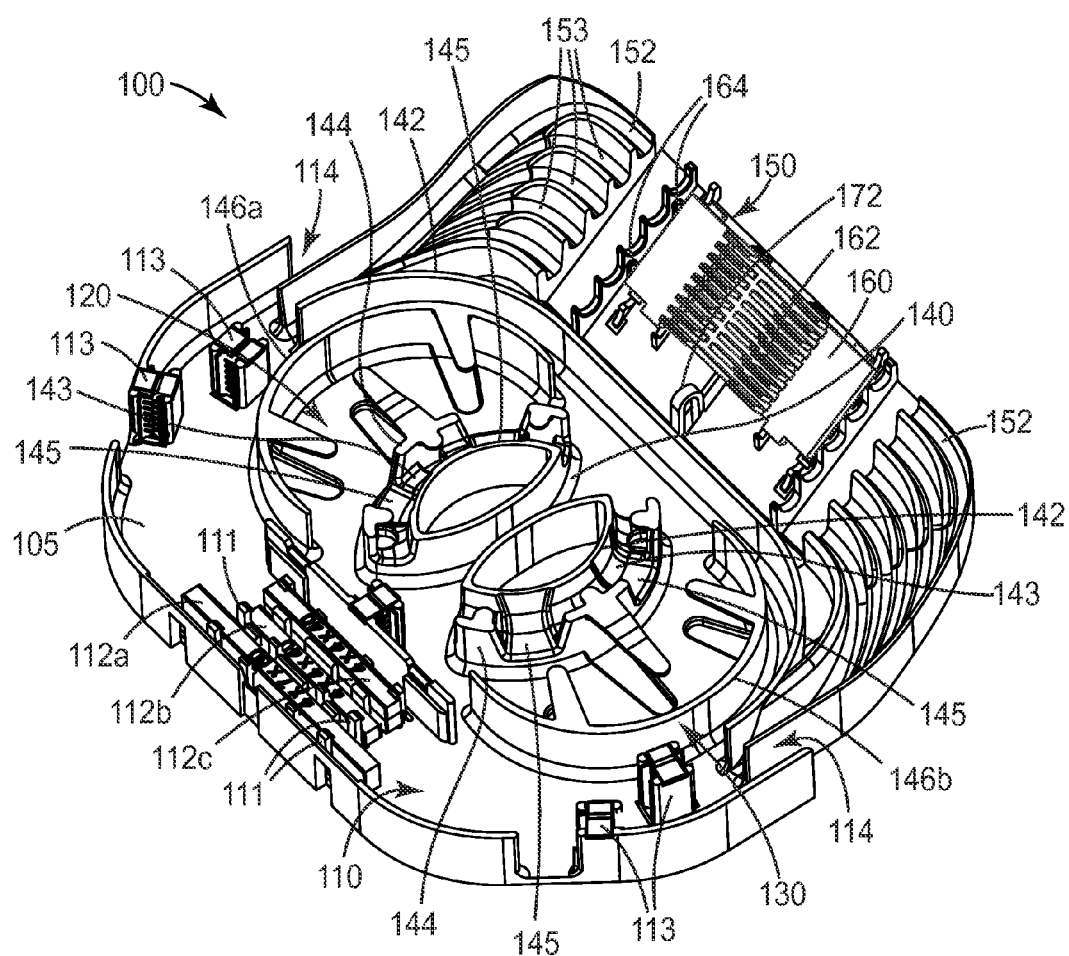
FIG. 1A is an isometric view of an exemplary organizer according to a first aspect of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention is directed to a fiber organizer and distribution box that provides modularity and flexibility for one or more service providers of telecommunication services to or within a building or other structure. The fiber organizer and distribution box can also be utilized for protected exterior applications as well. The fiber organizer and distribution box can be utilized as a fiber-to-the-home (FTTH) demarcation point and can be utilized for single or multiple operators. The fiber organizer and distribution box can be used for termination and riser applications and can be installed as an in-building box, e.g., for multi-dwelling units (MDUs), or a floor distribution box. The fiber organizer and distribution box can accommodate one or more splitters with or without splice trays, as the fiber organizer and distribution box can also accommodate a splice insert. In this manner, costs can be saved for smaller structures when separate splice trays are not required. Further, the fiber organizer and distribution box provide slack storage of spliced lines as well as separate storage for un-terminated fibers. The distribution box can include a patch panel and appropriate fiber cable strain relief.

Figure 1B:
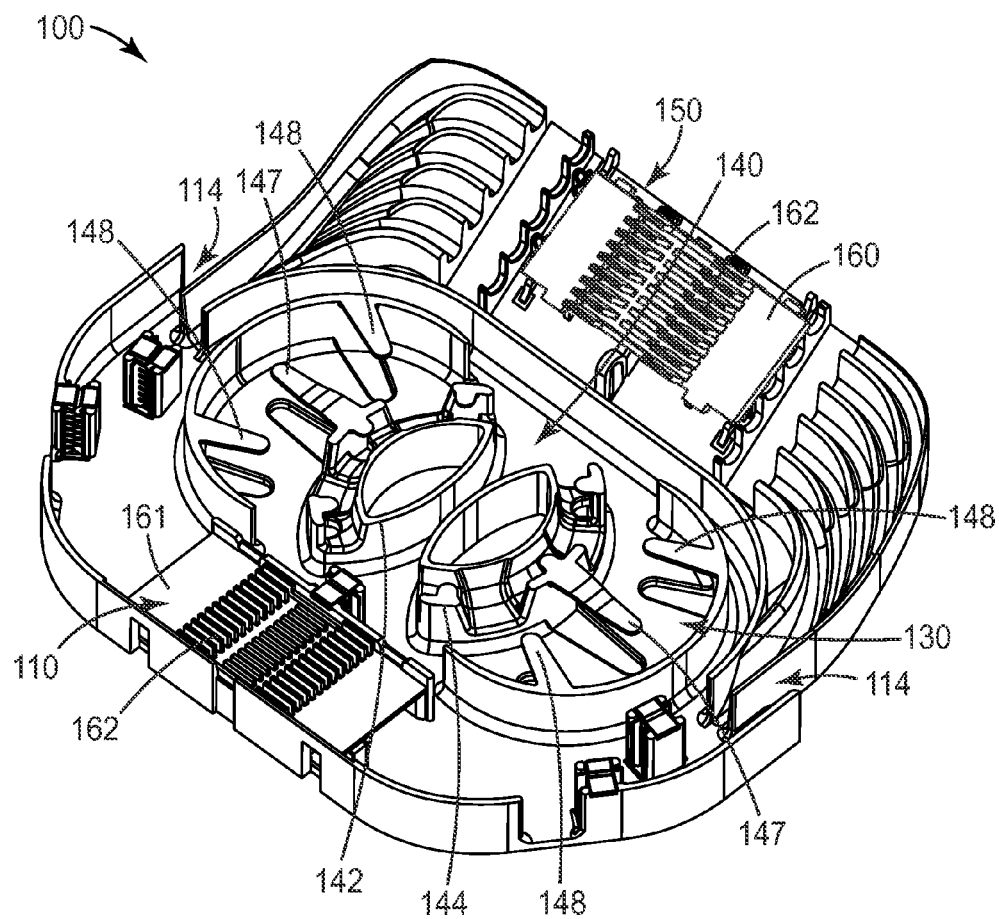
FIG. 1B is an isometric view of an exemplary organizer according to another aspect of the invention.
Figure 1C:
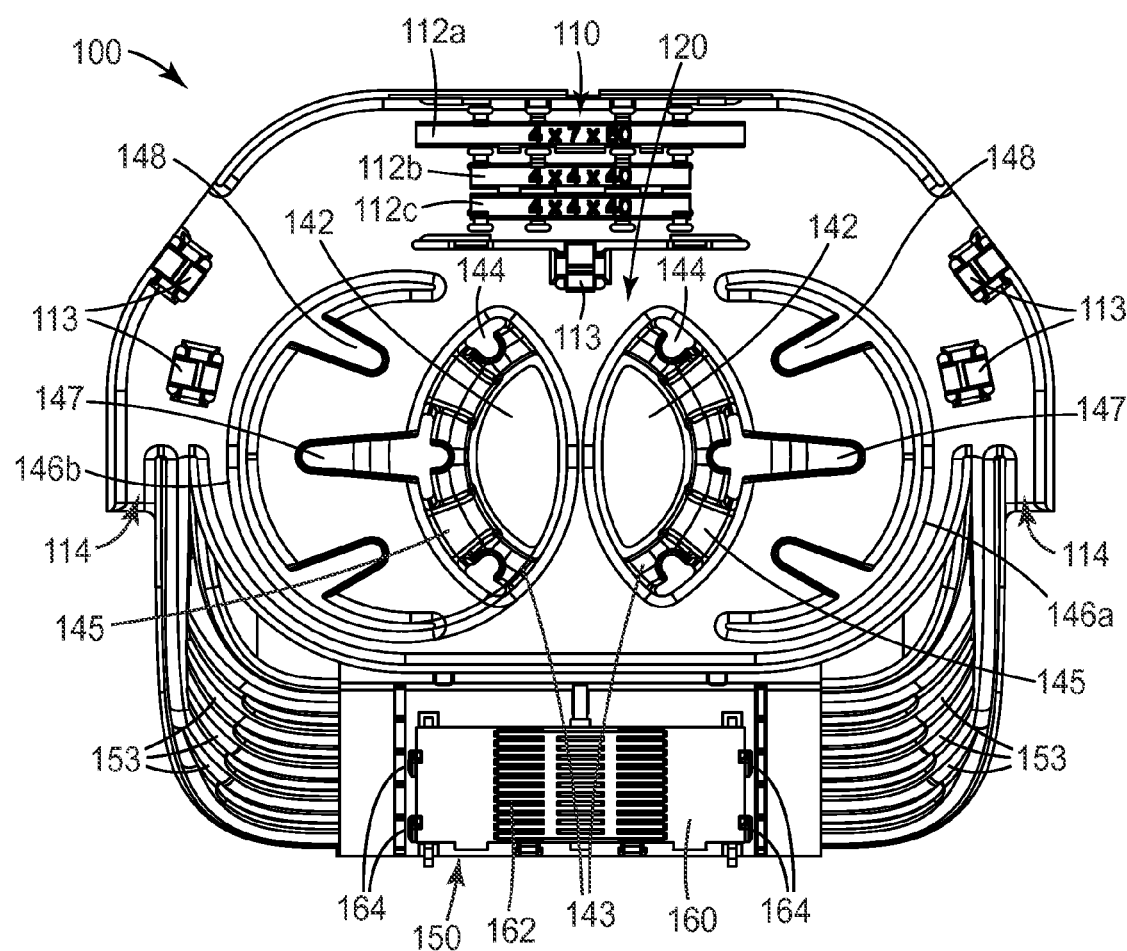
FIG. 1C is a top view of the exemplary organizer of FIG. 1A.
Figure 1D:
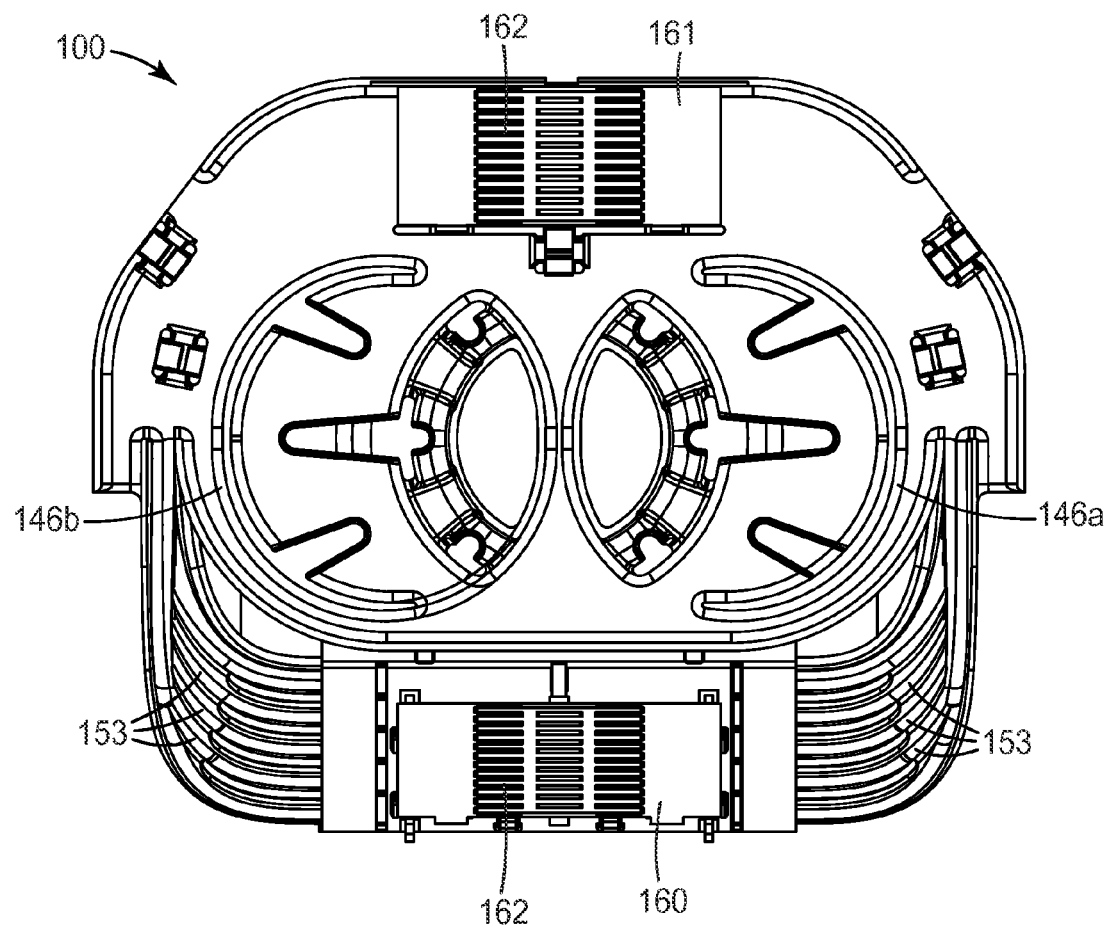
FIG. 1D is a top view of the exemplary organizer of FIG. 1B.

FIGS. 1A and 1B are isometric views of an exemplary fiber organizer 100 which can be utilized as a stand alone unit or be incorporated into a box, closure, or fiber distribution terminal (FDT), as described in more detail below. Alternatively, the organizer 100 can be utilized in other types of rack installations. FIGS. 1C and 1D show top views of the fiber organizer 100 shown in FIGS. 1A and 1B, respectively. The fiber organizer 100 is designed to manage telecommunications cables, preferably optical fiber cables, at a distribution point at or within a building or other structure. The organizer 100 provides for the connection between telecommunications lines and provides storage in an organized manner for slack cable and unterminated fibers. In a preferred aspect, organizer 100 has a multi-level structure formed on a generally planar base or floor 105 and includes a splitter holding section 110, a slack and unterminated fiber storage section 120, and a splice and splice tray holding section 150.

Incoming/outgoing optical fiber cable can enter/exit organizer 100 via entrance portions 114 that are arranged on one or more sides of base 105. Fibers are routed between the various sections of the organizer via a plurality of channels and other structures. In a preferred aspect, routed fibers can be secured within the organizer 100 via strain relief elements 113 positioned at various locations within organizer 100 to, at least in part, reduce the effects of pulling forces placed on the incoming/outgoing fiber cables. In this particular aspect, the strain relief elements can secure up to twelve fibers individually in separated grooves.

The fibers can be standard optical telecommunications fibers, for example, fibers having a standard optical fiber buffer coating, such as a 900 µm outer diameter buffer coating, a 250 µm buffer coating, or a fiber buffer coating having an outer diameter being larger or smaller. The fibers can also be cable break outs or fiber pigtails that are larger than 900 µm.

As mentioned above, organizer 100 includes a splitter holding section 110 that can accommodate one or more optical splitters. For example, as shown in FIG. 1A, a splitter holding section 110 includes a plurality of post structures 111 that can accommodate three or more splitters, 112a, 112b, 112c, each having the same size or a different size. Exemplary splitters include 1×N, 2×N, 4×N, and other conventional splitters. As described in further detail below, with respect to FIGS. 7A-7D, in an alternative aspect, the splitter holding section can be configured as a removable insert.

Alternatively, as is shown in FIG. 1B, splitter holding section 110 can be configured to secure a fiber splice insert 161 instead of, or in addition to, one or more splitters. Splice insert 161 can support one or more fiber splices, such as one or more fusion splices, or one or more mechanical splices, via one or more splice holding structures 162. In a preferred aspect, the splice holding structures 162 can be arranged in rows on the surface of the splice insert 161. The mechanical and/or fusion splices can be a single fiber splice or of a mass or ribbon fiber splice. The splice holding structures 162 can comprise a number of resilient clips or other holders designed to hold one or more conventional fusion splices or one or more mechanical splices, such as 4×4 FIBRLOK™ splices (commercially available from 3M Company, St. Paul Minn.), depending on the application. In this exemplary aspect, splice insert 161 is removably positioned over the splitters 112a-112c.

Organizer 100 further includes a slack and unterminated fiber storage section 120. In one aspect, slack and unterminated fiber storage section 120 is centrally disposed on base 105 and includes a slack storage region 130 and an unterminated fiber storage region 140. In this exemplary aspect, the slack storage region 130 permits storage of fiber cable slack for spliced fibers, while the unterminated fiber storage region 140 allows for separate storage of unterminated fiber, such that it can be easily accessed at a later time should splicing become necessary.

In one aspect, the slack storage region 130 includes a plurality of routing structures. In this exemplary aspect, the plurality of fiber routing structures includes two half ring structures 146a, 146b that permit slack fiber to be bent at an appropriate bend radius for the fiber. Fiber slack can be stored both outside of and inside of the half ring structures 146a, 146b. The slack storage region 130 can further include a plurality overhanging tabs 147, 148 to retain the slack and help prevent displacement of the spooled slack fiber. Of course, in alternative embodiments, the slack storage region 130 can comprise other structural elements, such as walls and/or posts, to retain excess fiber slack, as would be apparent to one of ordinary skill in the given the present description.

In addition, in this exemplary aspect, an unterminated fiber storage region 140 is disposed inside of the slack storage region 130. The unterminated fiber storage region 140 includes one or more spool-type structures 142 with a trough 143 formed between an outer wall of the spool-type structures 142 and several inner retention structures 144. The spool-type structures 142 and inner retention structures 144 are configured to permit fibers to be wrapped at an appropriate bend radius within the unterminated fiber storage region 140. In an exemplary aspect, the fiber storage trough 143 is a raised structure, formed above floor 105 of the organizer, and includes one or more access slots 145. The access slots 145 permit an installer to access stored fibers from the side (as opposed to just the top) using a finger or small access tool. In addition, as is shown in FIGS. 1A-1D, the spool-type structures 142 can be separated to more easily permit a change of direction of stored fiber. Thus, the unterminated fiber storage region 140 allows unterminated fibers to be stored separate from slack cables within the organizer 100 thus allowing an installer to access unterminated fiber without disturbing the stored slack cable.

In an alternative aspect, the configuration of the structures within the unterminated fiber storage section 120 permits the storage of fibers and cables in other ways. For example, fiber can be looped around outer wall 146a and either of spool structures 142 or fiber can be looped around outer wall 146b and either of spool structures 142.

Organizer 100 further includes a splice and splice tray holding section 150. The splice and splice tray holding section 150 is coupled to a fiber ramp 152 that can deliver fibers and fiber cables to and from the splice and splice tray holding section 150. In a preferred aspect, as is shown in FIGS. 1A-1D, the fiber ramp 152 can optionally provide one or more fiber channels 153 disposed on either or both sides of splice and splice tray holding section 150. In a preferred aspect, channels 153 have a deep U-shaped cross section to help prevent individual fibers from crossing over into other channels. In addition, the channels can be formed at a curvature to preserve the minimum bend radius of the routed fibers. Fibers from these channels are fed into either a splice insert 160 or one or more splice trays, as described in more detail below. The fiber ramp 152 can optionally further includes one or more fiber retention structures disposed in the fiber channels for further fiber guidance and support.

Figure 2A:
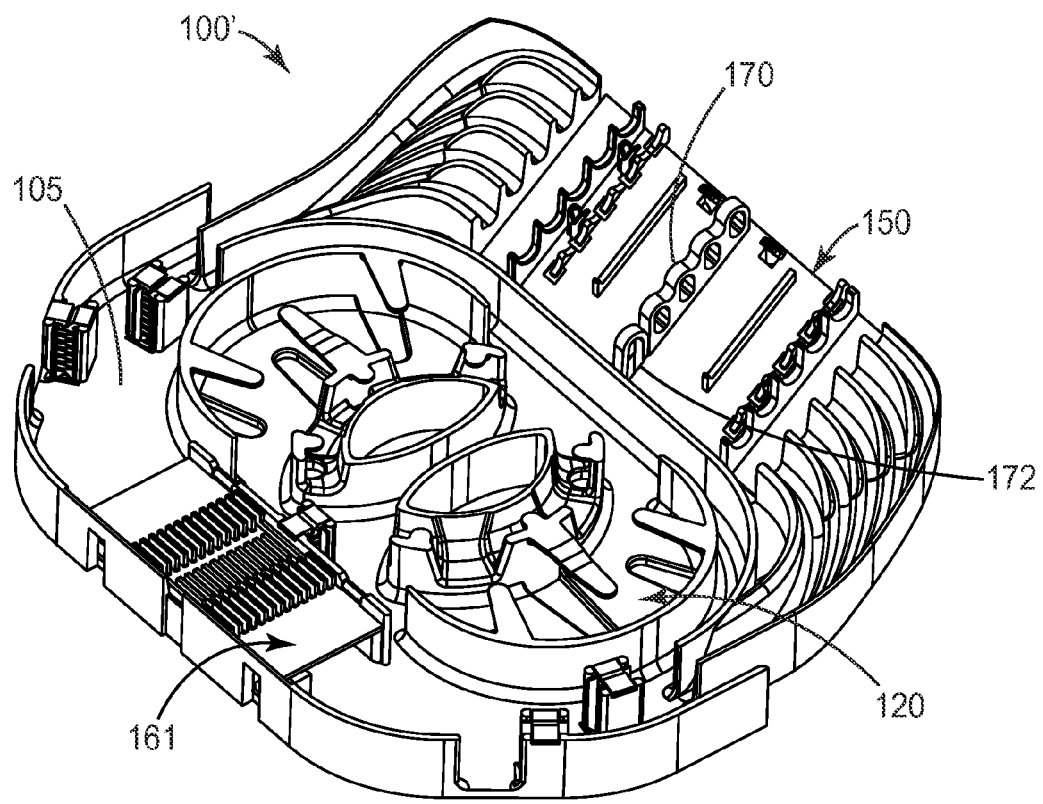
FIG. 2A is an isometric view of an exemplary organizer according to another aspect of the invention.
Figure 2B:
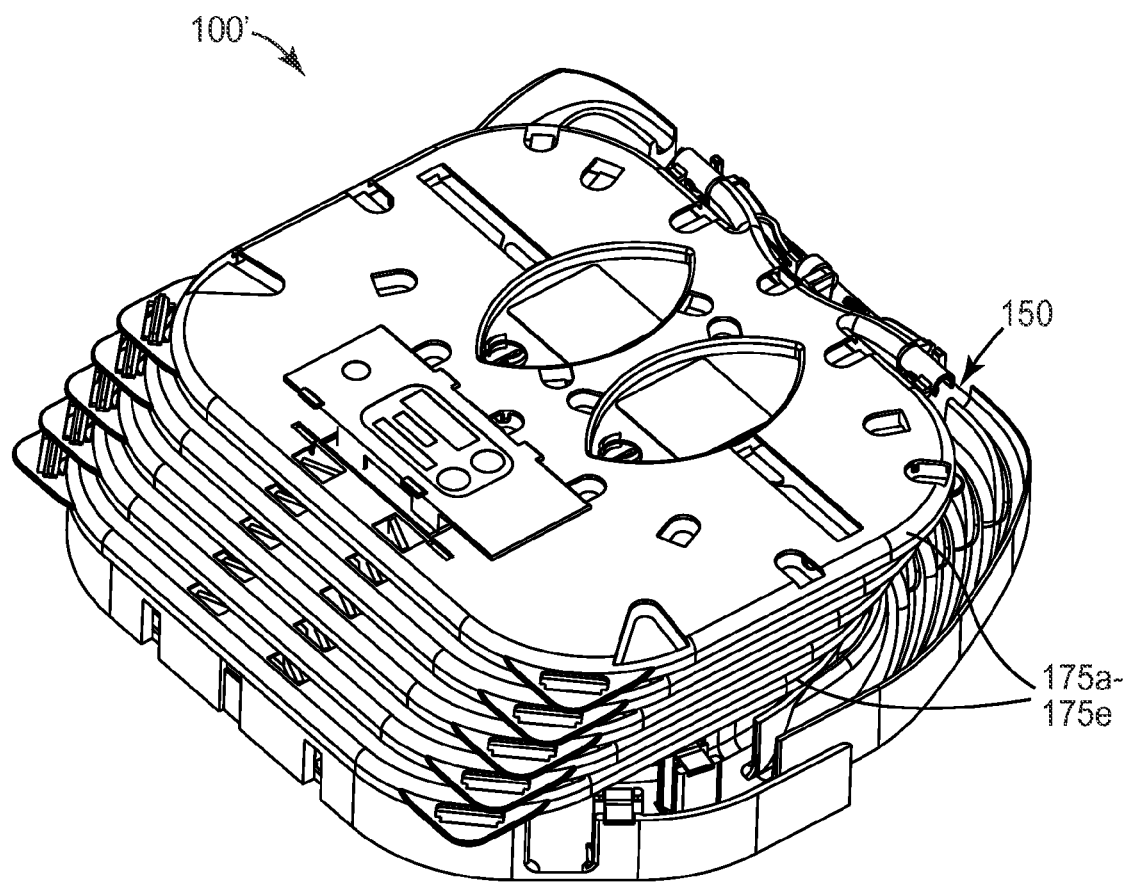
FIG. 2B is an isometric view of the exemplary organizer of FIG. 2A with a plurality of splice trays provided.

The splice and splice tray holding section 150 is configured to hold both a splice insert 160, such as shown in FIGS. 1A-1D and one or more splice trays 175a-175e, such as shown in FIG. 2B. In this manner, an installer can utilize organizer 100 in a variety of applications. Note that the fiber channels 153 are configured to guide the entering/exiting fibers around a modest bending region (not to exceed the minimum bend radius of the fiber(s) disposed therein) to/from the splice insert or the fiber entrance/exit channels of the splice tray(s).

In one aspect, the splice and splice tray holding section 150 holds a splice insert 160. Splice insert 160 can support one or more fiber splices, such as one or more fusion splices, or one or more mechanical splices, via one or more splice holding structures 162 and can be designed in a similar manner to splice insert 161 described above. Brackets 164 can be utilized to receive and secure splice insert 160 in place via, e.g., snap fit or interference fit. Brackets 164 can be configured to allow for the straightforward insertion and removal of splice insert 160. Further, brackets 164 can guide or position splice trays (described below) and/or fix their end positions.

Figure 2C:
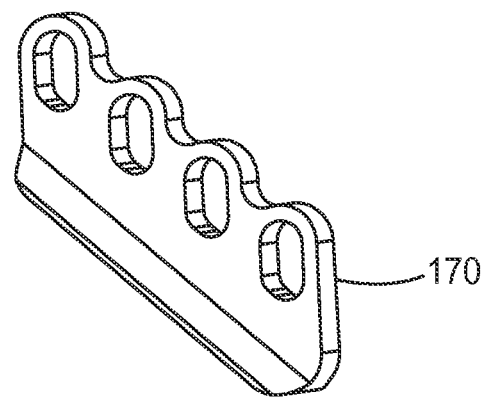
FIG. 2C is a close up view of an exemplary splice tray holder.
Figure 2D:
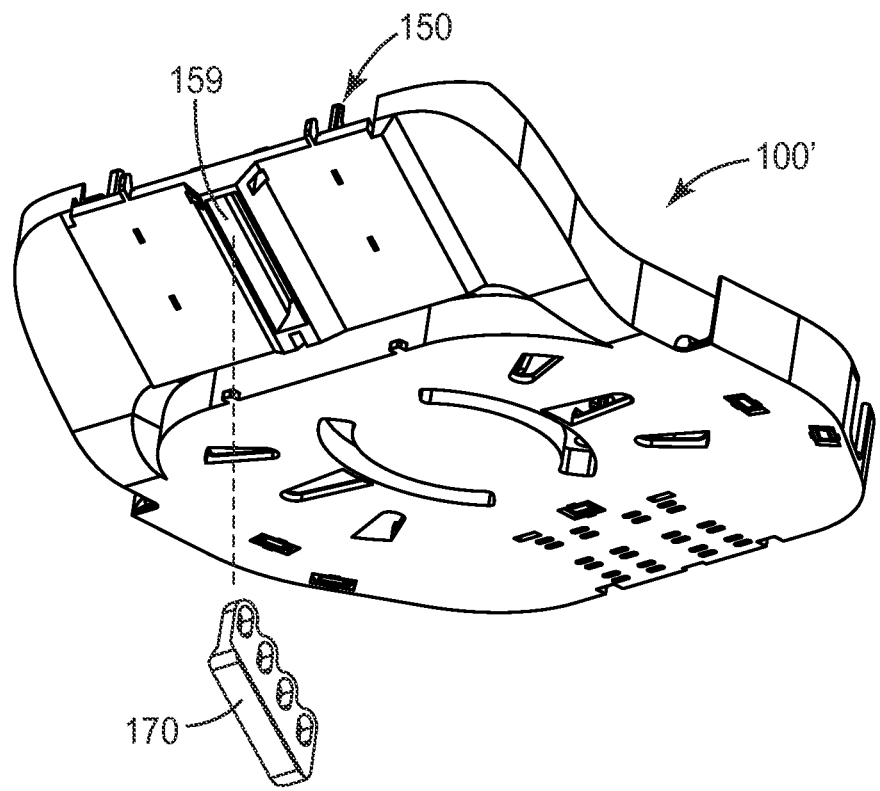
FIG. 2D is an isometric view from the bottom of an exemplary organizer with the splice tray holder removed.

In addition, the splice and splice tray holding section 150 can be configured to hold one or more splice trays. In a preferred aspect, the splice and splice tray holding section 150 is gradually elevated from the base 105 of organizer 100, 100' such as is shown in FIG. 2A. This configuration allows for the mounted splice trays to be secured in a stacked manner and to sit above the slack and unterminated fiber storage section 120. As shown in FIG. 2A, the splice and splice tray holding section 150 of exemplary organizer 100' includes a removable tray holder 170. The tray holder 170 is shown in detail in FIG. 2C. As shown in FIG. 2D, which shows an isometric view from below the organizer 100', the removable tray holder can comprise a multi-loop structure that can be inserted into a slot 159 formed in the splice and splice tray holding section 150. The tray holder 170 can be secured within slot 159 via snap fit or friction fit. In alternative aspects, the tray holder 170 can be removed from the splice and splice tray holding section 150 and replaced with splice insert 160 as described above. Optionally, a loop 172 can be integrally formed with the splice and splice tray holding section 150, as is shown in FIG. 1A. The loop 172 can be utilized to hold a single splice tray, if required.

The loops of tray holder 170 are configured to engage corresponding latching structures formed on one or more splice trays. FIG. 2B shows exemplary organizer 100' having five splice trays 175a-175e mounted on the splice and splice tray holding section 150, although a greater or lesser number of splice trays can be implemented, depending on the application.

In a preferred aspect, the splice trays are rotatable such that an installer can rotate splice trays to gain access to adjacent trays or the slack and unterminated fiber storage section 120 underneath. In FIG. 2B, splice trays 175a-175e are disposed in their normal operational position, in a stacked arrangement. In an alternative aspect, depending on the application or general working conditions, the splice trays can be secured in a reversed orientation (e.g., turned by 180° with respect to FIG. 2B). As shown in FIG. 2B, exemplary splice trays 175a-175e can be formed as generally rectangular or oblong structures. Although the term "splice tray" is used herein, in alternative aspects, trays 175a-175e can be configured to hold passive and/or active optical components, as well as splices. In a preferred aspect, splice trays 175a-175e can comprise commercially available, conventional splice trays, such as conventional 5 mm or 10 mm splice trays available from 3M Company (St. Paul, Minn.).

In an alternative aspect, the splice and splice tray holding section 150 can be configured to hold or secure any number of different passive and/or active optical components. For example, the splice and splice tray holding section 150 can be configured to hold or secure one or more of 1×N fiber optic splitters, 2×N fiber optic splitters, WDM components, CWDM components, switches, multiplexers, triplexers, duplexers, detectors, mirrors, lasers, amplifiers, or combinations thereof.

Figure 7A:
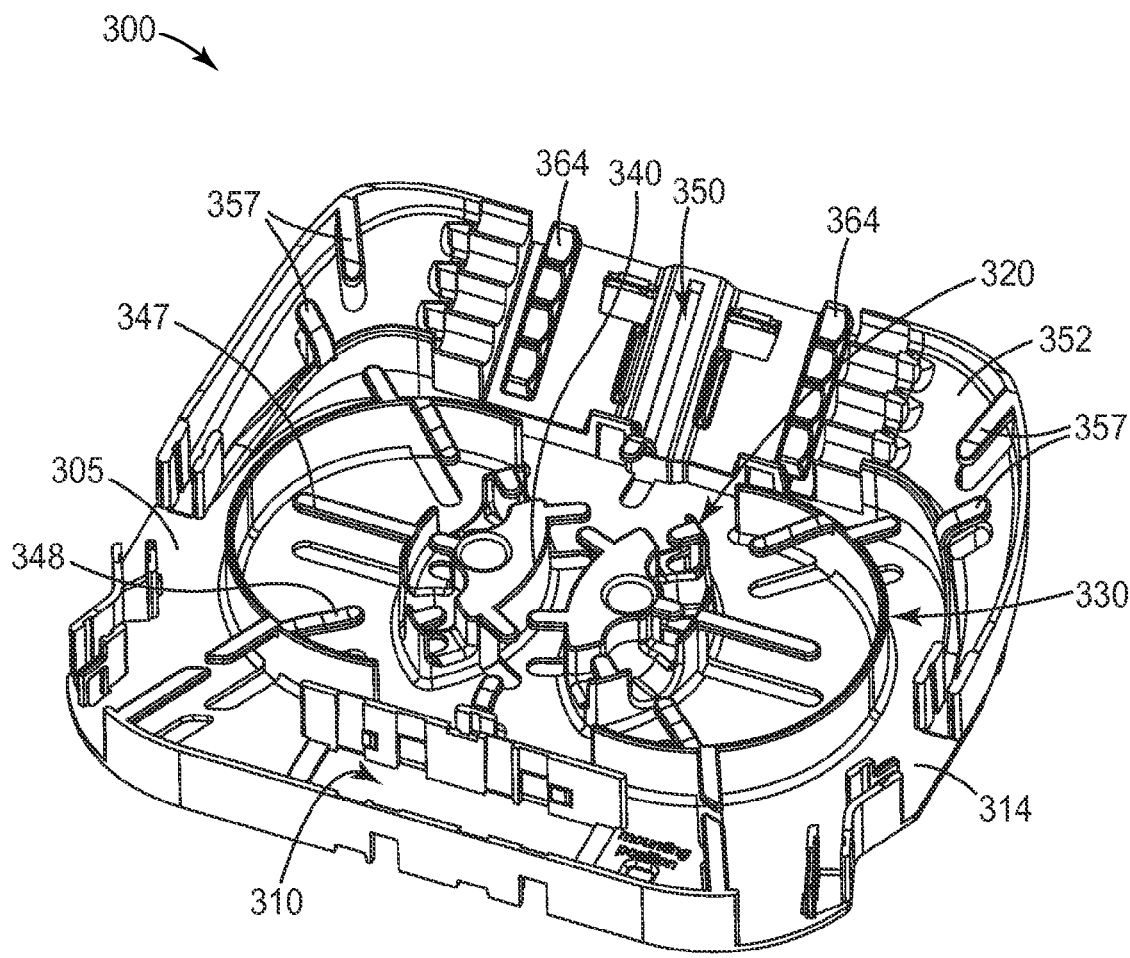
FIG. 7A is an isometric view of an exemplary organizer according to another aspect of the invention.
Figure 7B:
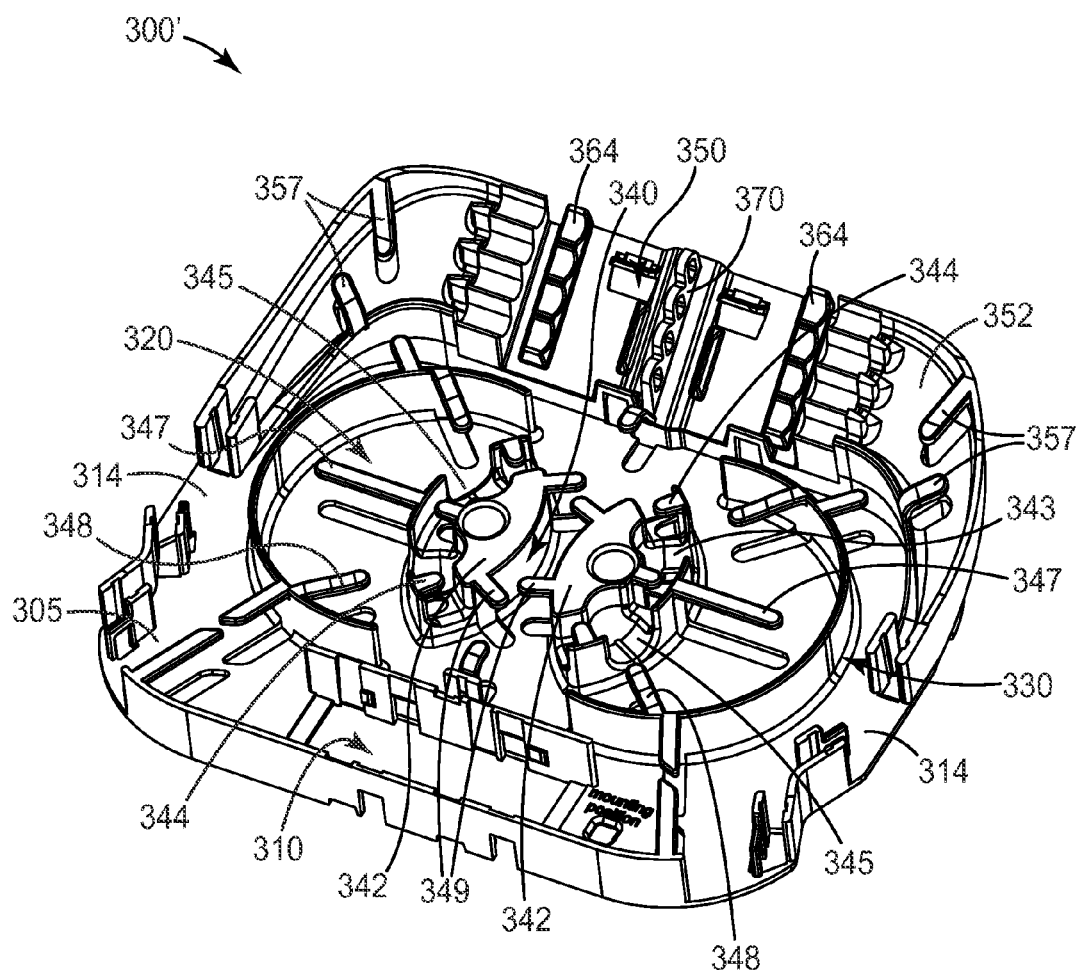
FIGS. 7B-7D are isometric views of yet another exemplary organizer according to another aspect of the invention.

Alternative aspects of the fiber organizer are shown in FIGS. 7A-7D. For example, FIG. 7A shows an alternative fiber organizer 300. FIG. 7B shows a further alternative fiber organizer 300'. In these alternative aspects, organizer 300, 300' has a multi-level structure similar to organizer 100 described above and includes a splitter holding section 310, a slack and unterminated fiber storage section 320, and a splice and splice tray holding section 350 formed on a generally planar base or floor 305. In these alternative aspects, the splitter holding section 310 is formed to receive a removable splitter insert (not shown) that accommodates one or more splitters or a splice insert (such as splice insert 361 shown in FIG. 7C) to accommodate one or more splices. Organizer 300' includes a tray holder 370, while organizer 300 does not.

Also, incoming/outgoing optical fiber cable can enter/exit organizer 300, 300' in multiple directions via entrance portions 314 that are arranged on one or more sides of base 305. In a preferred aspect, routed fibers can be secured within the organizer 300, 300' via strain relief elements 313 (see FIG. 7C) positioned at various locations within organizer 300, 300' to, at least in part, reduce the effects of pulling forces placed on the incoming/outgoing fiber cables.

Figure 7C:
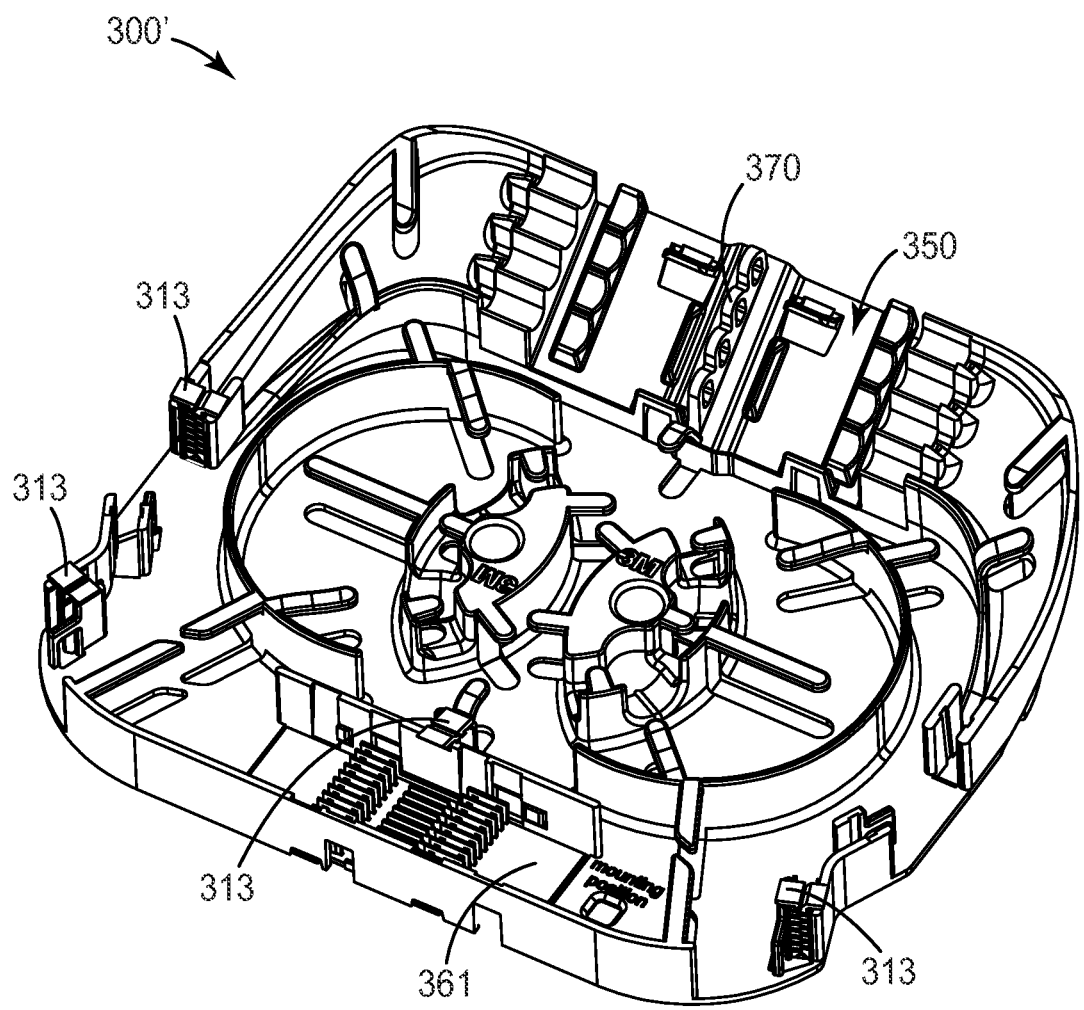
Figure 7D:
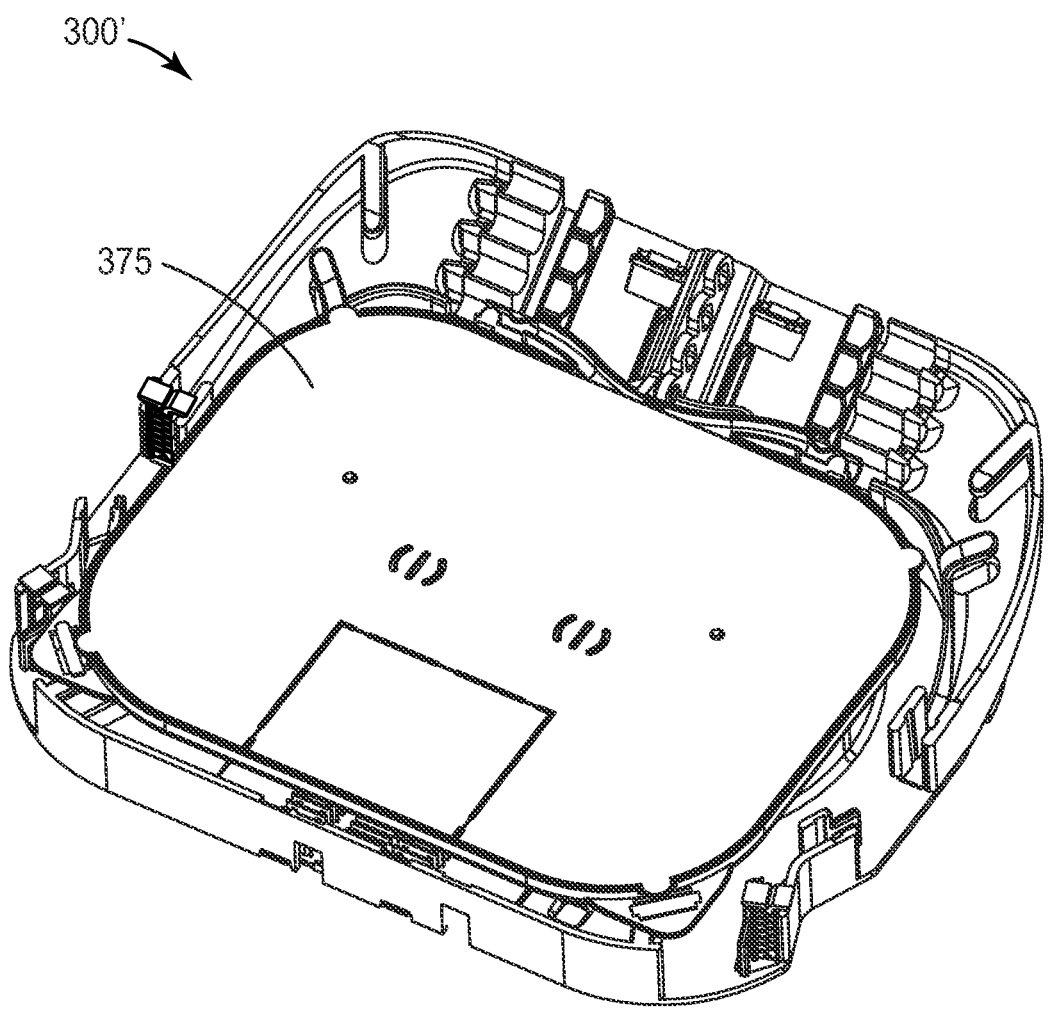

As mentioned above, organizer 300, 300' includes a splitter holding section 310 that can accommodate a removable splitter insert that secures one or more optical splitters. Alternatively, as is shown in FIG. 7C, splitter holding section 310 can be configured to secure a fiber splice insert 361 that can support one or more fiber splices, such as one or more fusion splices, or one or more mechanical splices, via one or more splice holding structures, similar to the splice inserts described above.

Organizer 300, 300' further includes a slack and unterminated fiber storage section 320 centrally disposed on base 305 that includes a slack storage region 330 and an unterminated fiber storage region 340. Similar to that described above, the slack storage region 330 permits storage of fiber cable slack for spliced fibers, while the unterminated fiber storage region 340 allows for separate storage of unterminated fiber, such that it can be easily accessed at a later time should splicing become necessary.

The slack storage region 330 can include includes a plurality of fiber routing structures formed as two half ring structures that permit slack fiber to be bent at an appropriate bend radius for the fiber. The slack storage region 330 can further include a plurality overhanging tabs 347, 348 to retain the slack and help prevent displacement of the spooled slack fiber. In addition, an unterminated fiber storage region 340 is disposed inside of the slack storage region 330. The unterminated fiber storage region 340 includes one or more spool-type structures 342 with a trough 343 formed between an outer wall of the spool-type structures and several inner retention structures 344. Overhanging tabs 349 help retain the spooled unterminated fiber. The spool-type structures 342 and inner retention structures 344 are configured to permit fibers to be wrapped at an appropriate bend radius within the unterminated fiber storage region 340. In an exemplary aspect, the fiber storage trough 343 is a raised structure, formed above floor 305 of the organizer, and includes one or more access slots 345. The access slots 345 permit an installer to access stored fibers from the side (as opposed to just the top) using a finger or small access tool. In addition, the spool-type structures 342 can be separated to more easily permit a change of direction of stored fiber.

Organizer 300, 300' further includes a splice and splice tray holding section 350. The splice and splice tray holding section 350 is coupled to a fiber ramp 352 that can deliver fibers and fiber cables to and from the splice and splice tray holding section 350. In this alternative aspect, a plurality of overhanging tabs 357 help retain the routed fiber and prevent the fiber from substantial displacement when the organizer 300, 300' is mounted vertically. Fibers are fed into either a splice insert (not shown) or one or more splice trays, such as splice tray 375 shown in FIG. 7D, that are secured in the splice and splice tray holding section in a manner similar to that described above. Brackets 364 can guide or position splice trays (described below) and/or fix their end positions.

Similar to organizer 100 described above, the splice and splice tray holding section 350 of organizer 300, 300' is gradually elevated from the base 305. This configuration allows for the mounted splice trays to be secured in a stacked manner and to sit above the slack and unterminated fiber storage section 320. In an alternative aspect, the splice and splice tray holding section 350 can be configured to hold or secure any number of different passive and/or active optical components.

The exemplary organizers described herein can be used in a variety of implementations to provide great flexibility. For example, the organizer can be utilized with the splitter holding section empty and/or the splice and splice tray holding sections empty. Alternatively, the splitter holding section can be empty and the splice and splice tray holding section can include a splice insert. Alternatively, the splitter holding section can be empty and the splice and splice tray holding section can include a splice tray holder and one or more splice trays. Alternatively, the splitter holding section can include a splitter insert or a splice insert and the splice and splice tray holding section can be empty. In a further alternative, the splitter holding section can include a splitter holder and a splice insert and the splice and splice tray holding section can include a splice insert or a splice tray holder. Further configurations can be utilized as would be apparent to one of ordinary skill in the art given the present description.

Figure 3A:
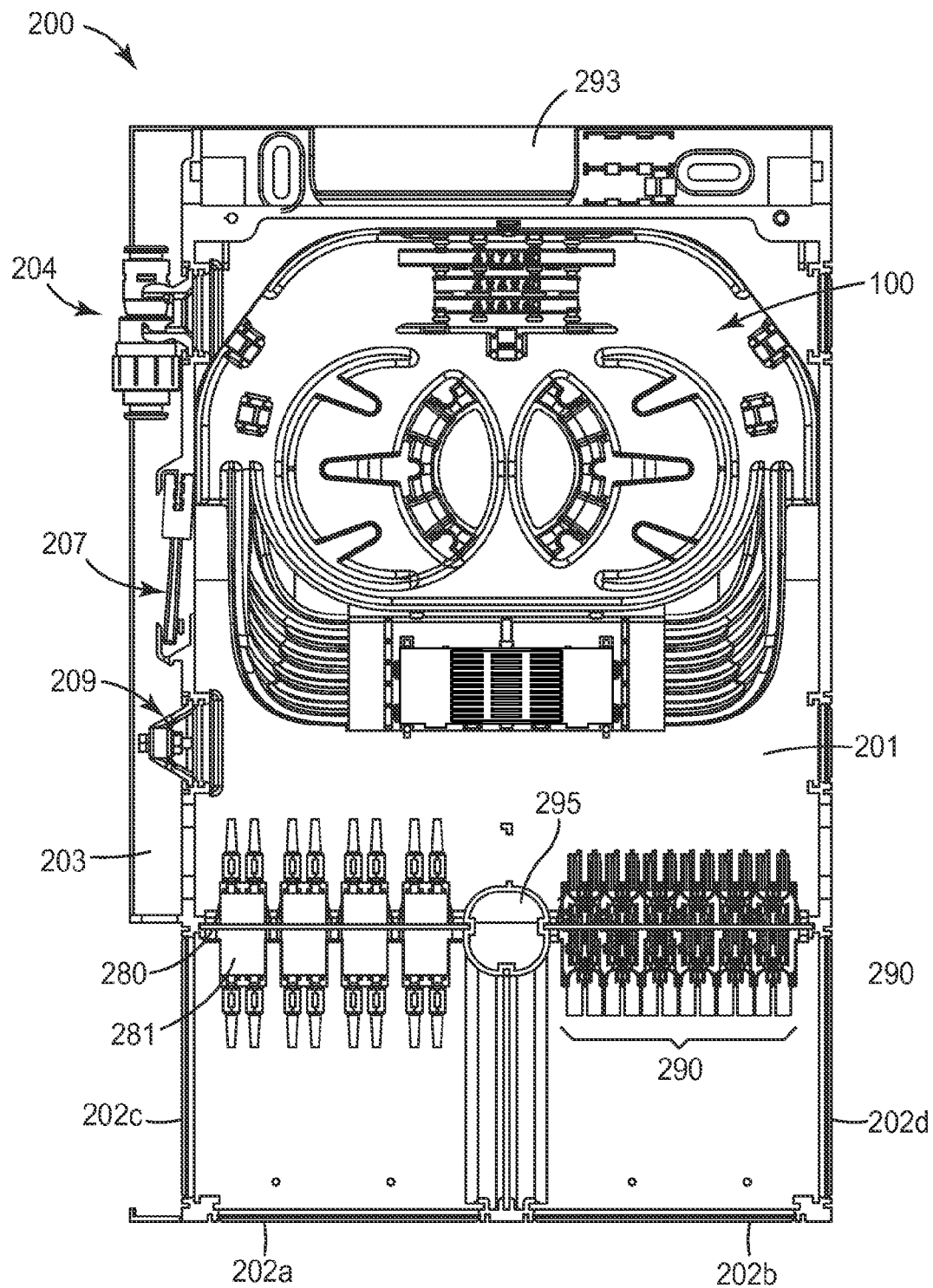
FIG. 3A is a top view of an exemplary distribution box according to another aspect of the invention.
Figure 3B:
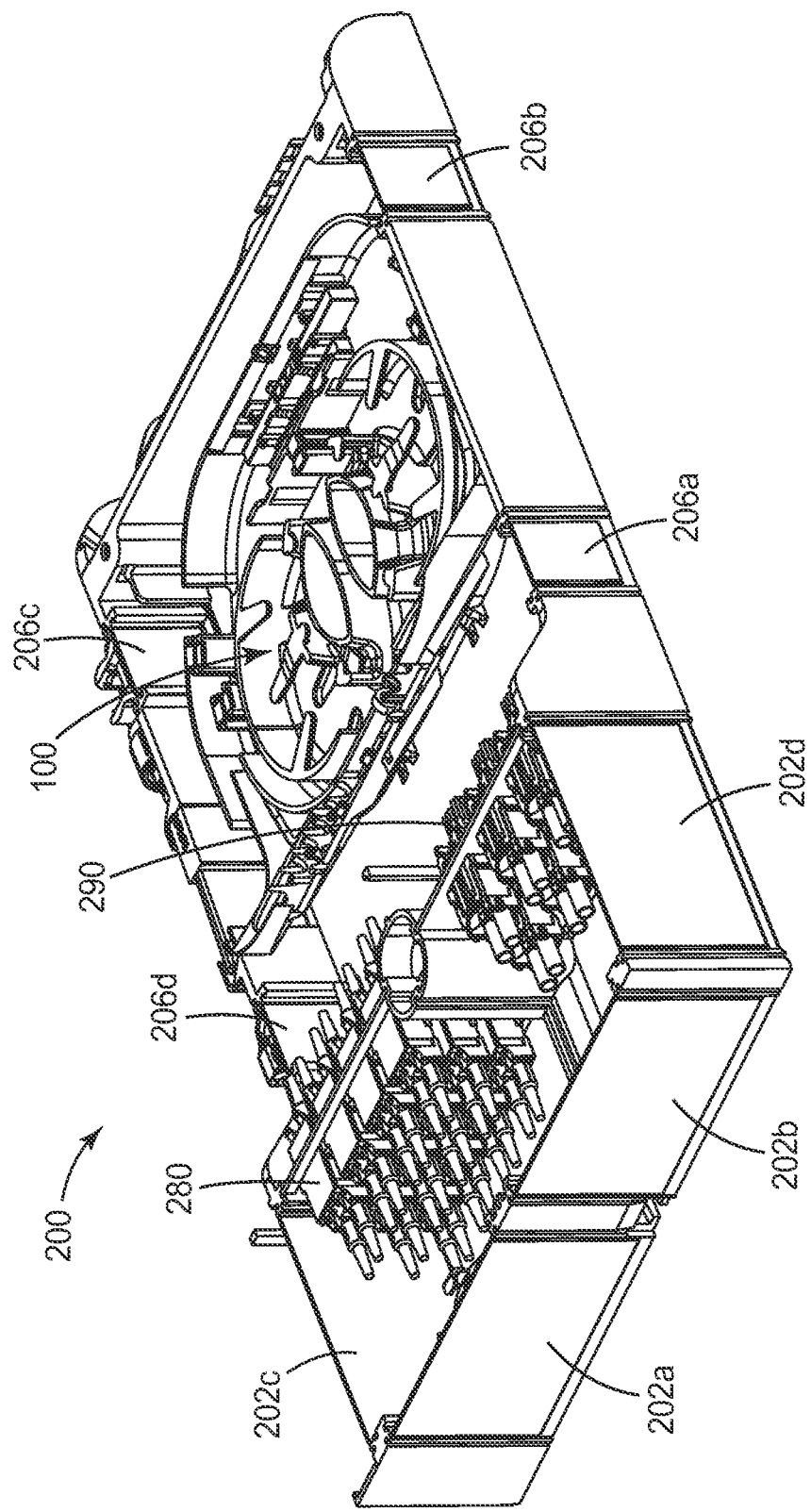
FIG. 3B is an isometric view of the exemplary distribution box of FIG. 3A with the splice trays removed.

As mentioned above, organizers 100, 100', 300, and 300' can be incorporated into a distribution box, closure, or fiber distribution terminal (FDT). FIGS. 3A and 3B show such exemplary embodiments, boxes 200 and 200', that include exemplary organizers 100, 100', respectively, such as is described above.

Figure 4:
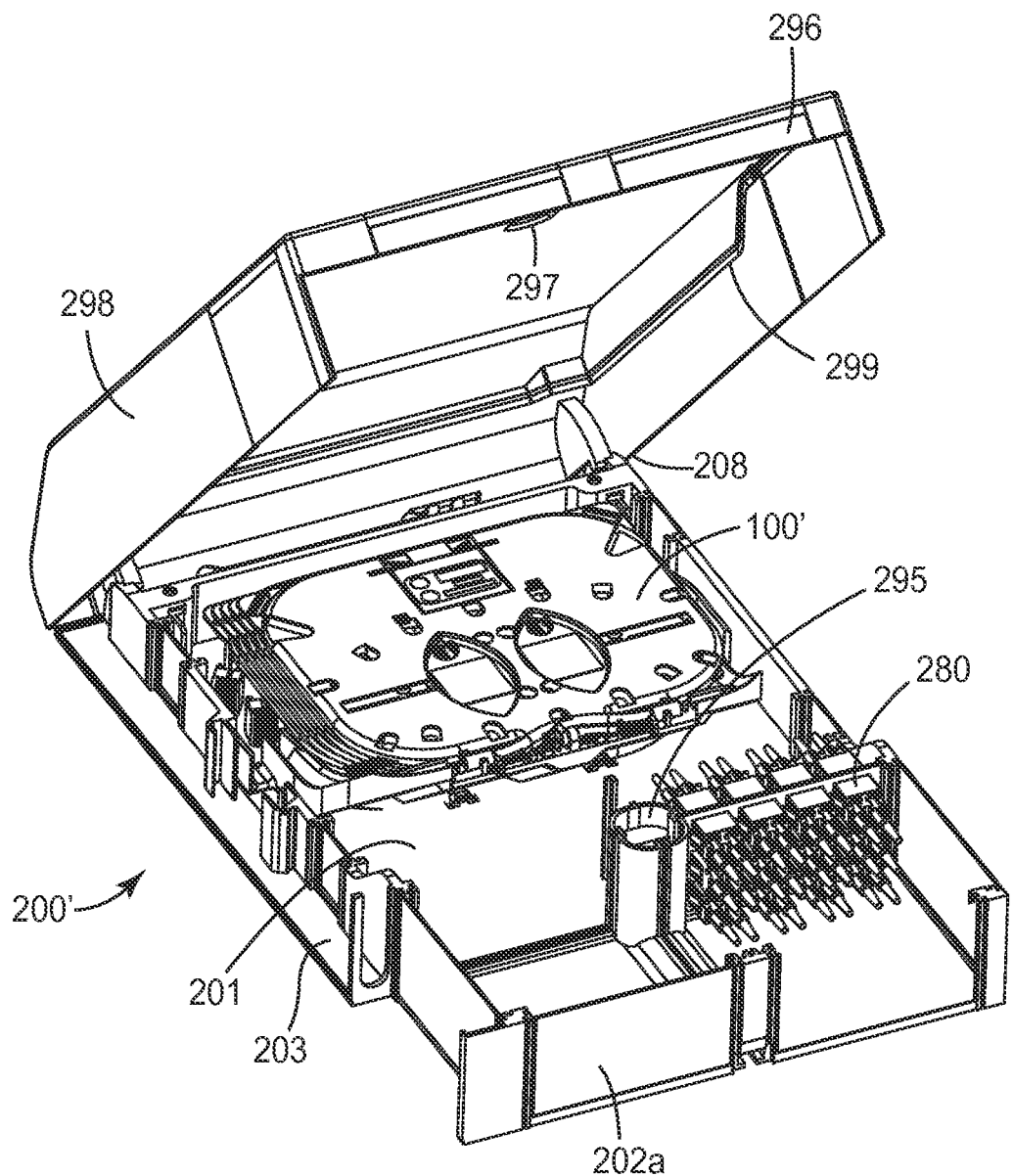
FIG. 4 is an isometric view of an exemplary distribution box according to another aspect of the invention.
Figure 5:
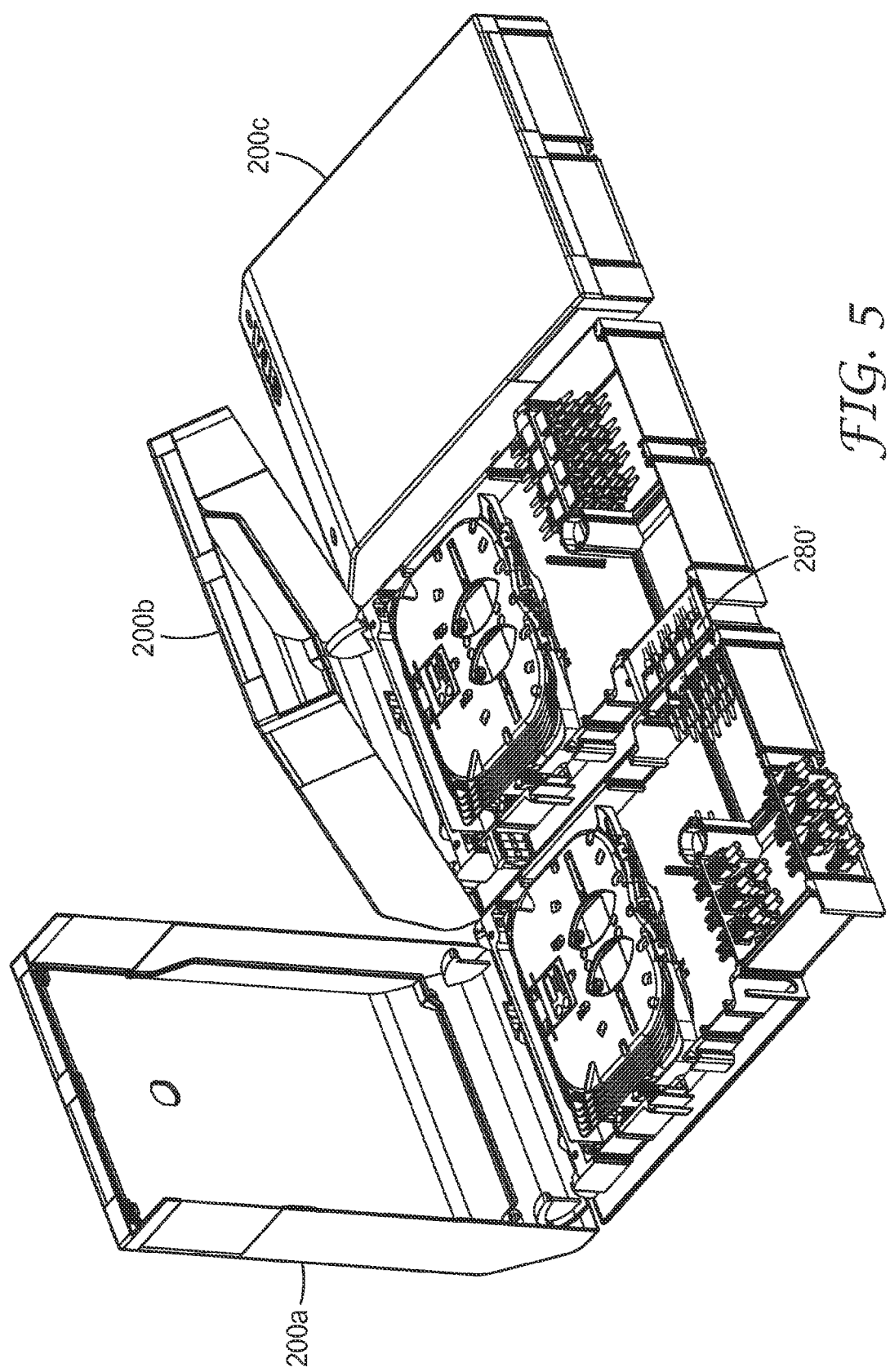
FIG. 5 is an isometric view of several exemplary distribution boxes according to another aspect of the invention.

Distribution box 200 includes a base 201 that is preferably a rigid material to support the organizer 100, side walls, and a cover (see FIG. 4). Box 200 can take any standard shape. Side walls can be comprised of a combination of permanent walls and removable walls, such as removable walls 202a-202d and removable walls 206a-206d (see e.g., FIG. 3B). In a preferred aspect, the box 200 can take a rectangular shape. By using a rectangular shape, the box 200 can be utilized in a modular manner, for example, with other boxes, as is shown in FIG. 5. Alternatively, for areas that are space-limited, box 200 can be of reduced dimensions. Box 200 can be mounted to a wall or other surface via one or more mount holes that are configured to receive conventional fasteners or wall mounts.

The various components of box 200, including the base, cover (see FIG. 4), organizer 100, and elements thereof, can be formed of any suitable material. The materials are selected depending upon the intended application and may include both polymers and metals. In one embodiment, the base and cover, and the other components, are formed of polymeric materials by methods such as injection molding, extrusion, casting, machining, and the like. Alternatively, components may be formed of metal by methods such as molding, casting, stamping, machining and the like. Material selection will depend upon factors including, but not limited to, chemical exposure conditions, environmental exposure conditions including temperature and humidity conditions, flame-retardancy requirements, material strength, and rigidity, to name a few.

An incoming telecommunications cable (or more than one incoming cable), such as a riser cable, (not shown), can be received by box 200 via a cable support channel 203, which is formed on a first side of the box along an outer wall of the box. In an exemplary aspect, the cable support channel 203 is formed as a ledge or shelf extending from a side of box 200. The cable can include one or more fibers. In some applications, box 200 can be configured to accommodate and manage twelve or fewer incoming fibers. In other applications, box 200 can be configured to accommodate more than twelve incoming fibers. Optionally, box 200 can include a second cable support channel on an opposite side of box 200 to support additional telecommunications cables.

Fibers can enter box 200 via an entrance port, such as entrance port 207, formed in a side wall of distribution box 200. As shown in FIG. 3B, box 200 can include a plurality of removable side walls 206a-206d that can be replaced by entry/exit ports. For example, entrance port 207 can include a flexible opening, such as a brush structure or sealing structure, such as a grommet. Alternatively, a cover plate or gasket can include a punch-out and/or cut-out portion to surround the incoming (e.g., riser) cable perimeter and reduce the ingress of outside elements from entering the box.

For telecommunications lines that include blown fibers, box 200 can include a gas-blocker device 204 mounted to a side wall of the box. The gas-blocker device can secure and receive cables having blown optical fibers contained therein. Further, cable strain relief can be provided via a universal strain relief device 209 mounted to the box that secures the strength members (e.g., aramid, glass yarn) of the telecommunications cable(s) to the box structure. In alternative aspects, box 200 can be implemented to receive telecommunications cables from any direction (when looking at FIG. 3A, the bottom left or right, the top left or right, from either the left or right side, or from underneath the base).

Fibers are routed within box 200 via the organizer 100 as described above. For example, unterminated fibers can be routed to the unterminated fiber storage area 140, lines can be spliced to pigtails via splice insert 160 or 161, and/or lines can be split via splitters installed in the splitter holding section 110. Organizer 100 (or 100', 300 or 300') can be mounted within distribution box 200, e.g., onto base 201, via conventional fasteners, such as screws, bolts, or clips. In addition, organizer 100 can be placed at any number of different positions on the base 201 (for example, adjacent the left side wall, adjacent the right side wall, adjacent the upper side wall, or centrally located on base 201), depending on the application to provide greater flexibility to the network installer. In addition, organizer 100, et al., can be disposed in different orientations within the distribution box, such as a first orientation with the splitter holding section nearer the front of the distribution box, or a second orientation with the splice and splice tray holding section nearer the front of the distribution box.

In addition, box 200 can include a patch panel or coupling field 280 that includes a plurality of couplings to receive standard connectors 281, such as SC format or LC format connectors (single or duplex). Thus, drop cables or connectorized jumper cables can be routed from patch panel 280 to end customers or other distribution units installed at the same location. Drop cables can access patch panel 280 through the side of box 200, which can include removable walls 202a and 202b. In a preferred aspect, box 200 can be configured to include a plurality of removable walls, as this configuration allows box 200 to be accessed in multiple locations or coupled to other boxes (such as shown in FIG. 5). As box 200 includes removable walls, patch panel 280 can be located in other positions within the box or on an outside wall of the box.

In addition to the patch panel 280, box 200 can include a plurality of strain relief devices 290 arranged in an array on a mounting device or on an inner wall of the box. These strain relief devices can be configured to be received in a standard connection receptacle. These strain relief devices can accept a variety of unterminated cables and protect them from inadvertent axial pulls. Such devices are described in U.S. patent application Ser. Nos. 61/417,562 and 61/417,569, incorporated by reference herein in their entirety. Access to the array of strain relief devices can be made by removing a wall, such as wall 202b or 202d shown in FIG. 3A. This arrangement can be useful for distribution boxes located in MDUs (e.g., medium to large office buildings, hospitals, hotels, or apartment buildings where there is a need to route cables to a large number of floors or sections within the building to provide service to several locations from a single access point.

Optionally, distribution box 200 can further include a storage compartment 293 that provides for the storage of excess components and accessories.

Distribution box 200 can further include a locking structure 295 that engages with a locking mechanism disposed in a cover for the box. For example, as shown in FIG. 4, in another exemplary aspect, an exemplary box 200' can include a cover 296. In this aspect, cover 296 is rotatably mounted to base 201 via a conventional hinge 208. Alternatively, the cover 296 can be fastened to the base unit of the box via conventional fasteners, such as screws. A locking mechanism 297 can be located in cover 296 and can be positioned to engage with locking structure 295 when the cover is placed in a closed position. This configuration allows the service provider to secure the box to prevent unauthorized access to the box/organizer after installation. Cover 296 can be constructed of single or double injection molded parts. For example, the outer wall 298 of the cover can be formed from a more robust material, such as a polycarbonate (PC) or acrylonitrile butadiene styrene (ABS) material, while an inner portion of the cover, such as inner cover portion 299, can be formed from a different material, such as a thermoplastic elastomer (TPE) material. Further, the inner cover portion 299 can be configured to correspond to the perimeter of the side walls of distribution box 200. With this type of construction, the inner cover portion 299 can help seal the interior of the distribution box from elements such as dirt and water. Thus the cover 296 can be used to define a dry area of the distribution box, such as the general interior of the distribution box where the organizer is disposed, and a wet area of the distribution box, such as the area where cable support channel 203 is disposed.

As mentioned above, box 200 can have a modular structure that provides for straightforward implementation of several boxes together, depending on the application. The appearance of each box 200 can be uniform, leading to better aesthetics where needed. For example, as is shown in FIG. 5, boxes 200a, 200b, 200c can be implemented as side-by-side units in an exemplary application. The boxes can be coupled via patch panels (e.g., patch panel 280' permits connection between terminated cables from boxes 200a and 200b) without cables having to pass outside of the box walls. Thus, the front portions of the boxes can provide a raceway between boxes. In addition, a bridge or other structure can be utilized to link the distribution boxes together to provide for passage of cables between the distribution boxes.

Figure 6:
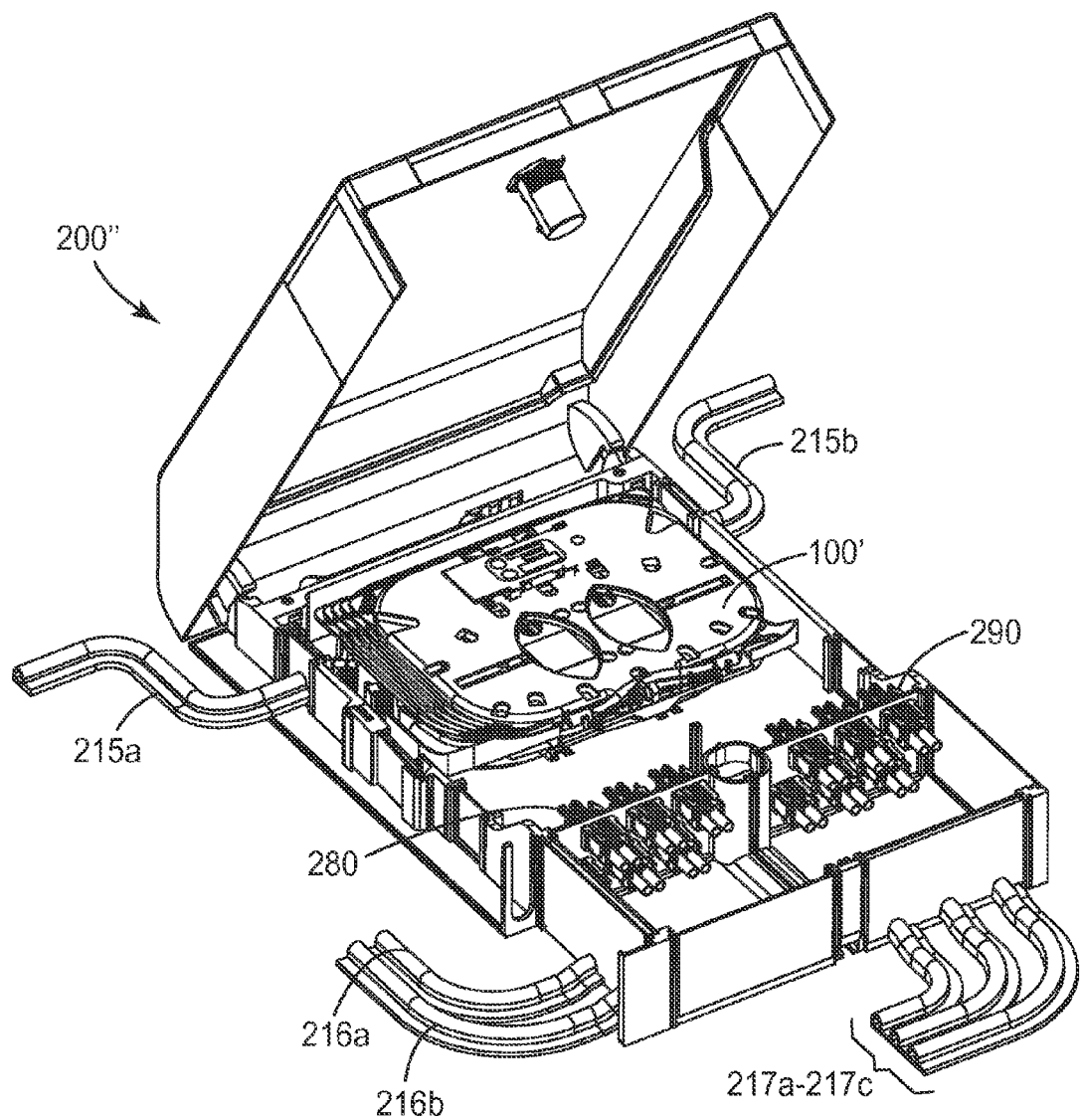
FIG. 6 is an isometric view of an exemplary distribution box according to another aspect of the invention.

In another aspect of the invention, an exemplary fiber distribution terminal 200" for an MDU is shown in FIG. 6. Box 200" includes an exemplary organizer 100', such as that described above, along with a patch panel 280 and a field of strain relief devices 290, such as is described above. Incoming multi-fiber cables 215a and 215b can enter box 200" from opposite sides of the box, as is shown in FIG. 6. Outgoing cables, such as drop cables 216a, 216b, or unterminated cables 217a-217c, can exit the box 200" at different locations as well.

Figure 8A:
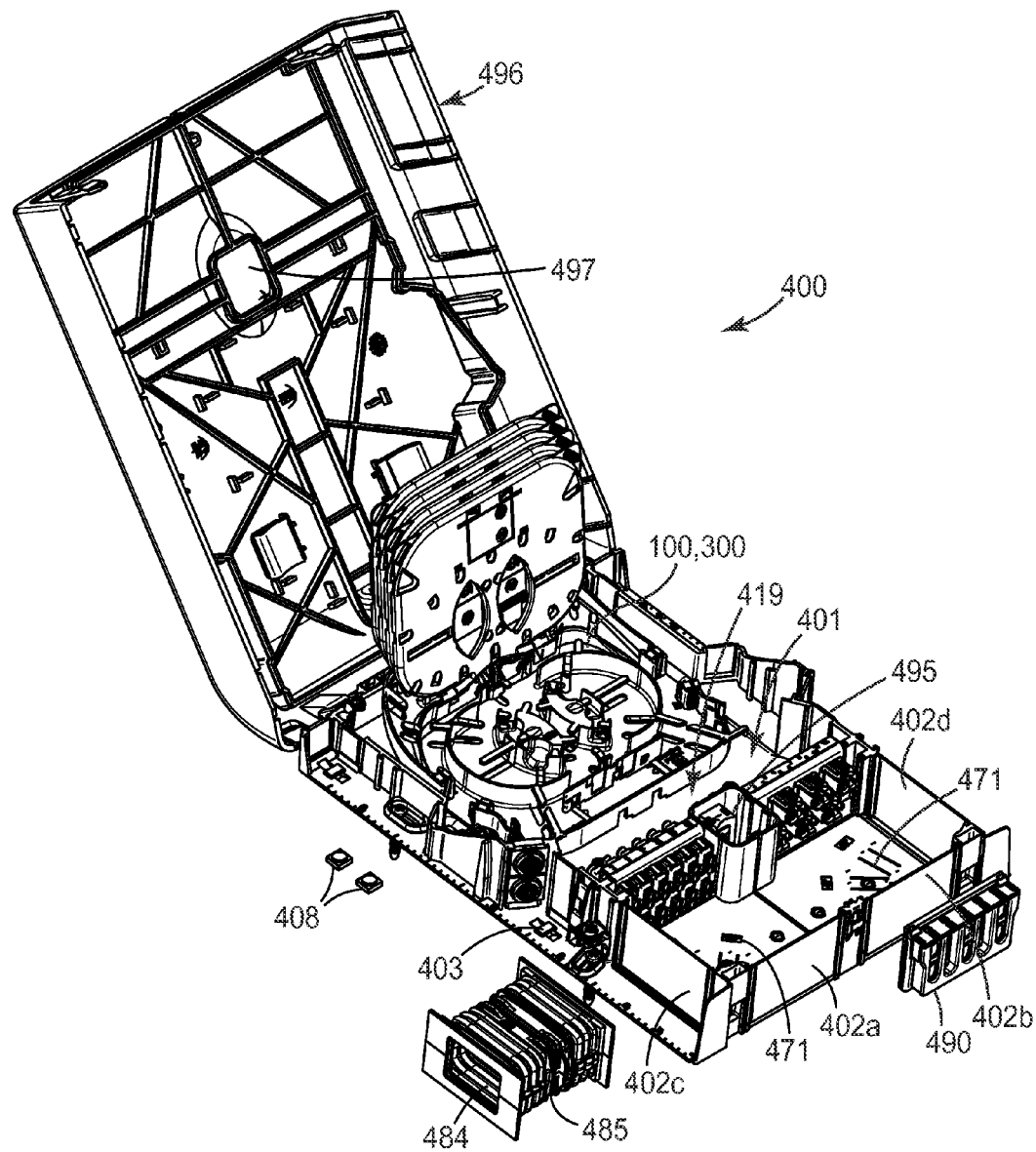
FIGS. 8A-8E are various views of an exemplary distribution box according to another aspect of the invention.
Figure 8B:
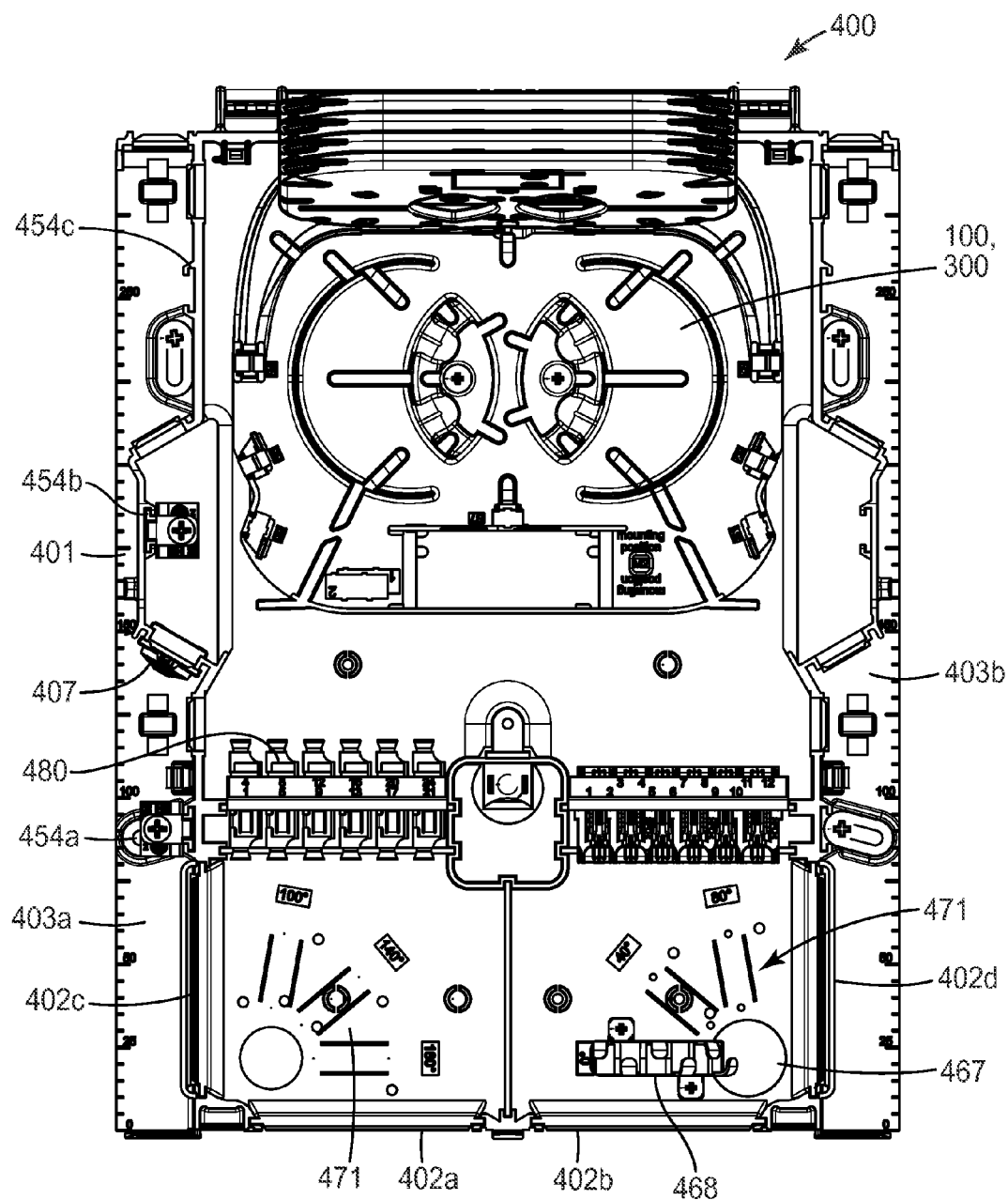
Figure 8C:
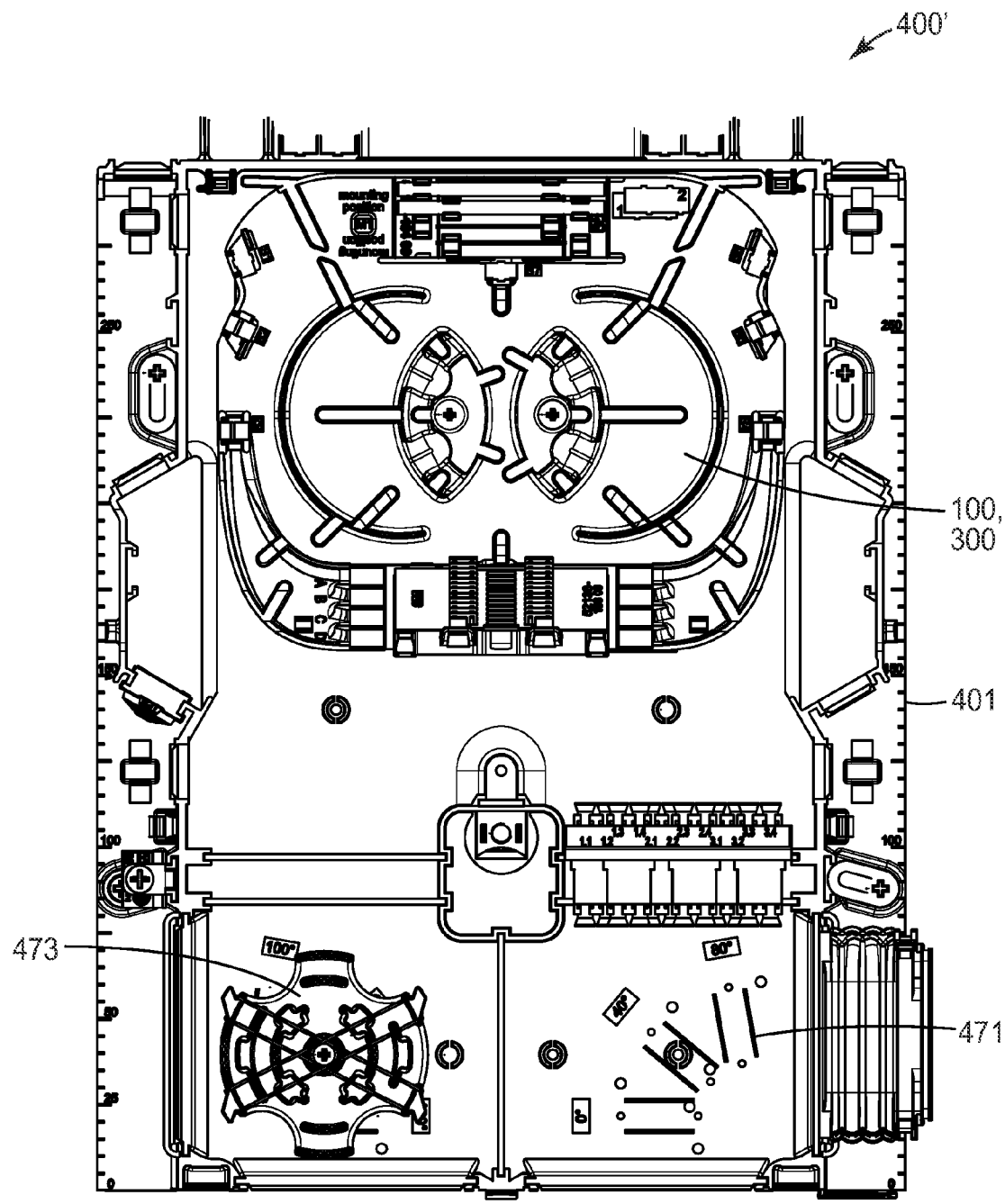
Figure 8D:
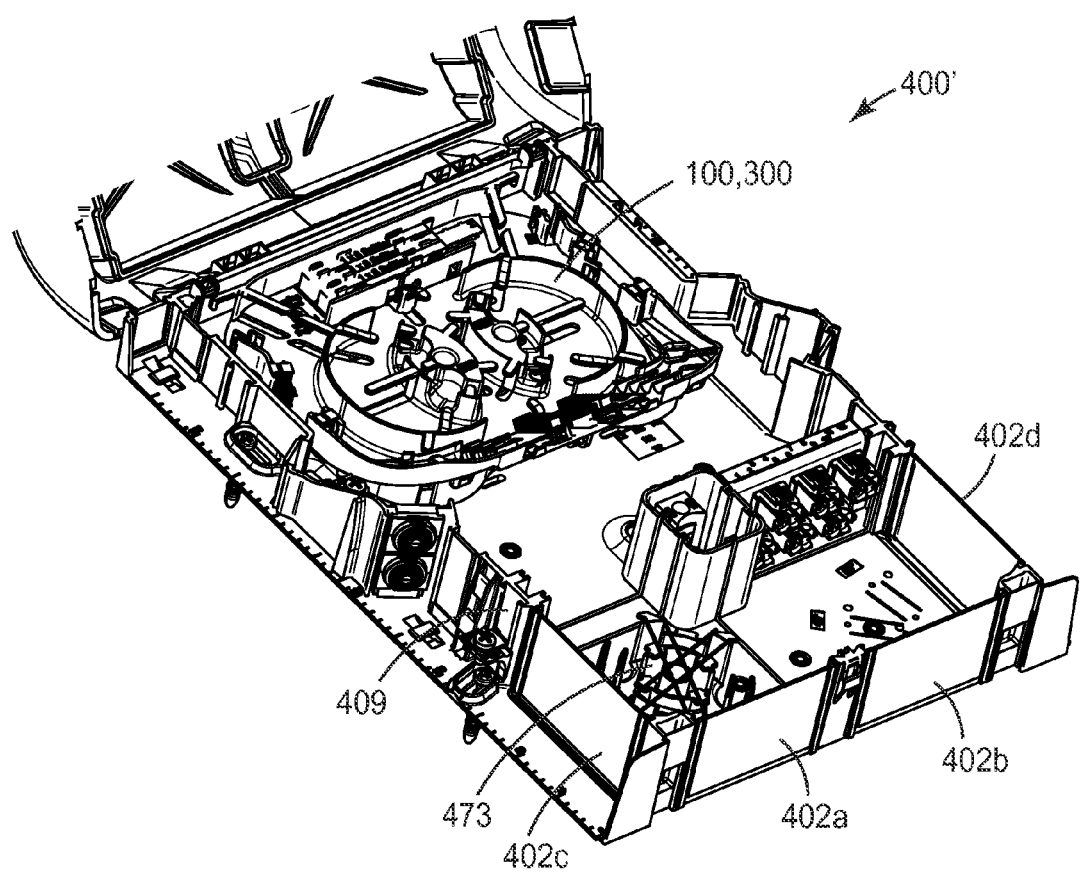
Figure 8E:
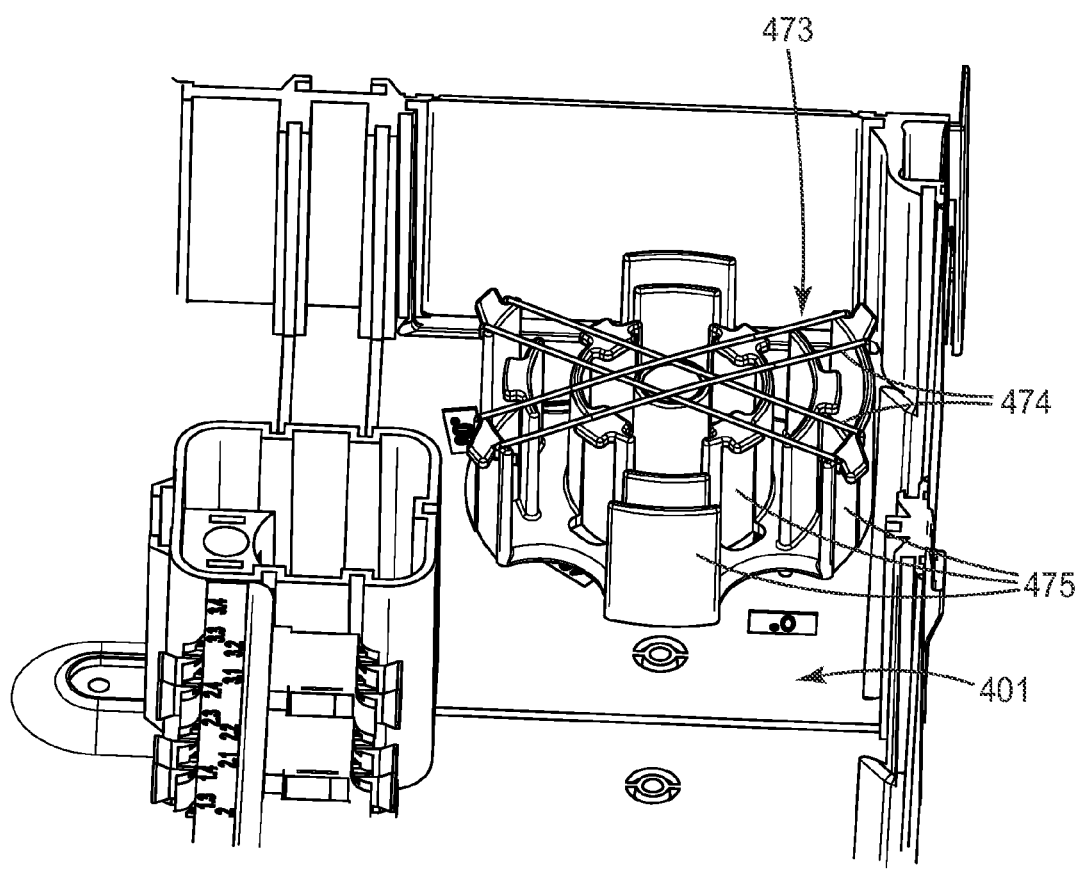
Figure 9A:
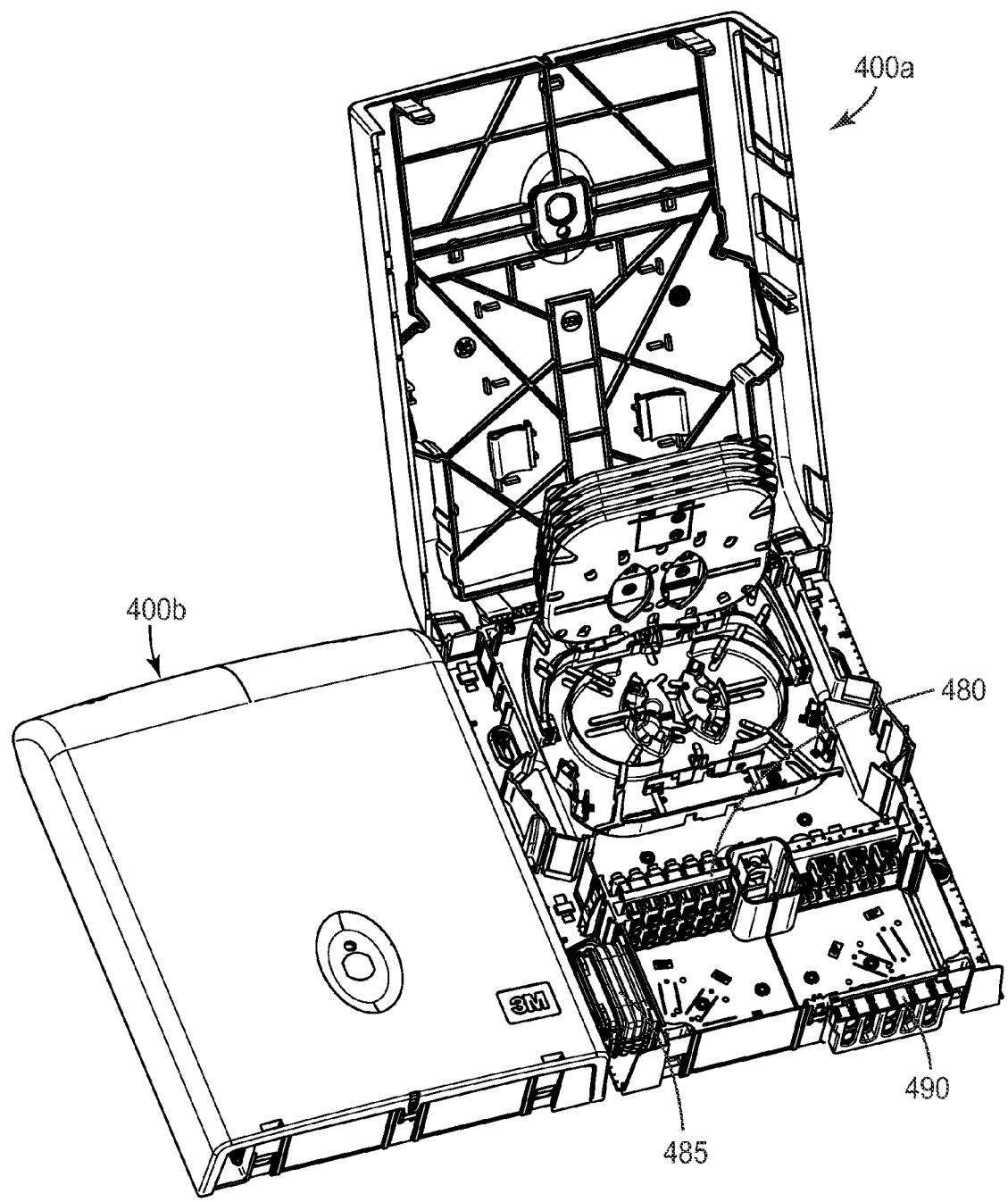
Figure 9B:
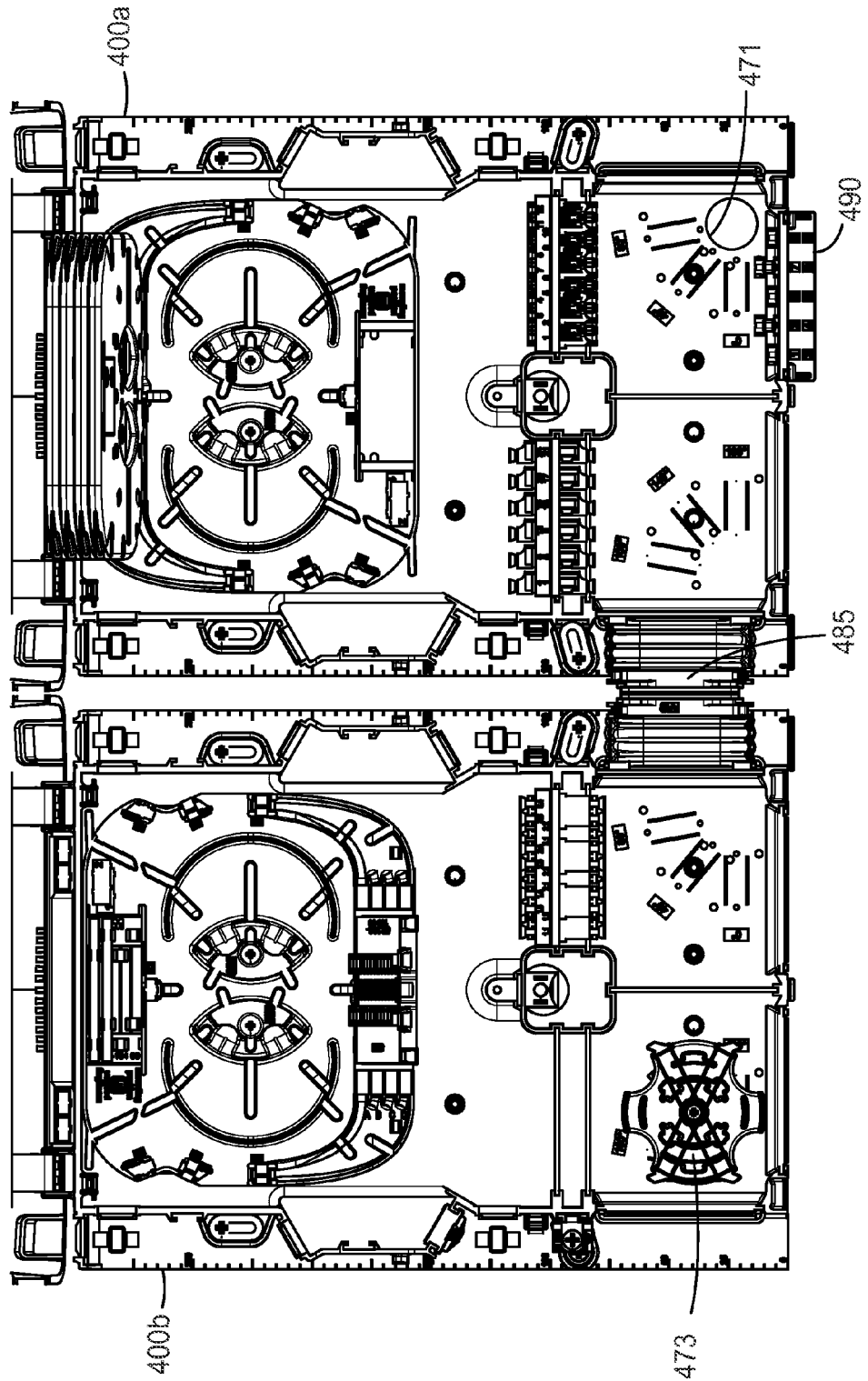

In a further aspect of the invention, another exemplary distribution box 400 is shown in FIGS. 8A-8E. Distribution box 400 includes a base 401 that is preferably a rigid material to support any of the organizers 100, 100', 300, 300' described herein, in addition to side walls and a cover 496. Box 400 can take any standard shape. Side walls can be comprised of a combination of permanent walls and removable walls, such as removable walls 402a-402d. In a preferred aspect, the box 400 can take a rectangular shape. By using a rectangular shape, the box 400 can be utilized in a modular manner, for example, with other boxes, as is shown in FIGS. 9A-9C. Alternatively, for areas that are space-limited, box 400 can be of reduced dimensions. Box 400 can be mounted to a wall or other surface via one or more mount holes that are configured to receive conventional fasteners or wall mounts.

The various components of box 400, including the base, cover, organizer, and elements thereof, can be formed of any suitable material. The materials are selected depending upon the intended application and may include both polymers and metals. In one embodiment, the base and cover, and the other components, are formed of polymeric materials by methods such as injection molding, extrusion, casting, machining, and the like. Alternatively, components may be formed of metal by methods such as molding, casting, stamping, machining and the like. Material selection will depend upon factors including, but not limited to, chemical exposure conditions, environmental exposure conditions including temperature and humidity conditions, flame-retardancy requirements, material strength, and rigidity, to name a few.

An incoming telecommunications cable having one or more optical fibers (or more than one incoming cable), such as a riser cable, can be received by box 400 via a cable support channel 403a, which is formed on a first side of the box along an outer wall of the box (see FIG. 11, described below, which shows a cable entering alternative distribution box 500). In an exemplary aspect, the cable support channel 403a is formed as a ledge or shelf extending from a side of box 400. In a preferred aspect, cable support channel 403a includes markings, similar to that of a ruler or other measuring device, to assist the craftsperson during installation. In some applications, box 400 can be configured to accommodate and manage twelve or fewer incoming fibers. In other applications, box 400 can be configured to accommodate more than twelve incoming fibers. In this aspect, distribution box 400 includes a second cable support channel 403b located on an opposite side of box 400 to support additional telecommunications cables.

Fibers can enter box 400 via an entrance port, such as entrance port 407, formed in a side wall of distribution box 400. For example, entrance port 407 can include one or more sealing structures 408, such as grommets, to allow for insertion of one or more cables into the distribution box. Each grommet can be shaped as a series of concentric rings which can be cut out as appropriate in a straightforward manner to accommodate fiber cables of different sizes. In one alternative aspect, two grommets 408 can be stacked on top of each other at entrance port 407 to allow for insertion of two fiber cables into box 400. Alternatively, a cover plate or gasket can include a punch-out and/or cut-out portion to surround the incoming (e.g., riser) cable perimeter and reduce the ingress of outside elements from entering the box.

For telecommunications lines that include blown fibers, box 400 can include a gas-blocker device (see e.g., device 504 shown in FIG. 11) mounted to a side wall of the box. The gas-blocker device can secure and receive cables having blown optical fibers contained therein. Further, cable strain relief can be provided via a universal strain relief device 409 mounted to the box that secures the strength members (e.g., aramid, glass yarn) of the telecommunications cable(s) to the box structure. In some aspects, more than one strain relief device 409 can be provided on the side of box 400 to accommodate more than one cable. FIG. 12, which is described in more detail below, shows an exemplary universal strain relief device 409. In alternative aspects, box 400 can be implemented to receive telecommunications cables from any direction (when looking at FIG. 8B, the bottom left or right, the top left or right, from either the left or right side, or from underneath the base).

Fibers are routed within box 400 via the organizer 100, 100', 300, 300' as described above. Organizer 100, 100', 300, 300' can be mounted within distribution box 400, e.g., onto base 401, via conventional fasteners, such as screws, bolts, or clips. In addition, organizer 100, 100', 300, 300' can be placed at any number of different positions on the base 401 (for example, adjacent the left side wall, adjacent the right side wall, adjacent the upper side wall, or centrally located on base 401), depending on the application to provide greater flexibility to the network installer. In addition, organizer 100, 100', 300, 300' can be disposed in different orientations within the distribution box, such as a first orientation with the splitter holding section nearer the front of the distribution box, or a second orientation with the splice and splice tray holding section nearer the front of the distribution box.

In addition, box 400 includes one or more patch areas 471 that can provide room for patching cables and extra cable storage. Optionally, the organizer area can also include a small patch area, such as patch area 419 shown in FIG. 8A. In addition, the patch areas 471 can include markings to assist the craftsperson during installation. As shown in FIG. 8B, in some aspects, patch area 471 can include a port 467 disposed in the base 401 that permits passage of cables to and from the rear side of distribution box 400. A cable ramp 468 can also be disposed within patch area 471 near port 467 to retain entering/exiting cables and preserve bend radius conditions. The cable ramp can be fixed at a particular angle (e.g., 0°, 40°, 80°, etc.), as indicated by the internal markings, depending on the cable entry/exit conditions desired by the installer.

As is also shown in FIG. 8B, a patch panel or coupling field 480 can be disposed on an inner wall that includes a plurality of couplings to receive standard connectors, such as SC format or LC format connectors (single or duplex). Thus, drop cables or connectorized jumper cables can be routed from patch panel 480 to end customers or other distribution units installed at the same location. Drop cables can access patch panel 480 through the side of box 400, which can include removable walls 402a and 402b. As box 400 includes removable walls, patch panel 480 can be located in other positions within the box or on an outside wall of the box.

In another aspect, one or more of the patch areas 471 can include a patchcord storage device 473. As shown in more detail in FIG. 8E, the patchcord storage device 473 can comprise a modified spool shape having several cable routing structures 475 used to wind excess cable lengths for storage. The cable routing structures 475 are configured to permit cables to be wrapped at an appropriate bend radius. The patchcord storage device 473 can further include one or more retention structures 474 mounted above the spool to retain the cable and help prevent displacement of the spooled cable. In an exemplary aspect, the patchcord storage device 473 can be rotated by a predetermined angle, then fixed in position, such as to one of several fixation points, to allow the cable (e.g., patchcord, pigtail, individual fiber, etc.) to enter/exit where appropriate.

In addition to the patch panel 480, distribution box 400 can include a plurality of strain relief devices 490 arranged in an array on a mounting device or on an outer or inner wall of the box. These strain relief devices can be configured to be received in a standard connection receptacle. These strain relief devices can accept a variety of unterminated cables and protect them from inadvertent axial pulls. These devices can be configured as shown in more detail in FIGS. 13A-13D and FIGS. 14A-14D. Alternatively, such devices can be configured as described in U.S. patent application Ser. Nos. 61/417,562 and 61/417,569, incorporated by reference herein in their entirety.

In this aspect of the invention, an array of strain relief devices 490 (see e.g., array 490' or array 490", described below) can be inserted in the same wall slots as removed wall 402b. This arrangement can be useful for distribution boxes located in MDUs (e.g., medium to large office buildings, hospitals, hotels, or apartment buildings where there is a need to route cables to a large number of floors or sections within the building to provide service to several locations from a single access point.

Distribution box 400 can further include a locking structure 495 that engages with a locking mechanism 497 disposed in cover 496. In this aspect, cover 496 is rotatably mounted to base 401 via a conventional hinge to allow the installer to access the interior of the box. In addition, the cover can be configured to be fixed at a particular opening angle. The cover 496 can be fastened to the base unit of the box via conventional fasteners, such as screws. A locking mechanism 497 can be located in cover 496 and can be positioned to engage with locking structure 495 when the cover is placed in a closed position. This configuration allows the service provider to secure the box to prevent unauthorized access to the box/organizer after installation. Cover 496 can be constructed of single or double injection molded parts. For example, the outer wall of the cover can be formed from a more robust material, such as a polycarbonate (PC) or acrylonitrile butadiene styrene (ABS) material.

In another aspect, a separate inner cover can be provided which covers a smaller area within the distribution box, such as the organizer area. This inner cover can also be separately lockable. This structure provides for separation of craft within distribution box 400. The inner cover can be formed of the same material, or a different material, such as a polycarbonate (PC) or acrylonitrile butadiene styrene (ABS) material. With this type of construction, the interior of the distribution box can be protected from elements such as dirt and water. Thus, the cover 496 can be used to define a dry area of the distribution box, such as the general interior of the distribution box where the organizer is disposed separate from a wet area of the distribution box, such as the area where cable support channel 403 is disposed.

Figure 10A:
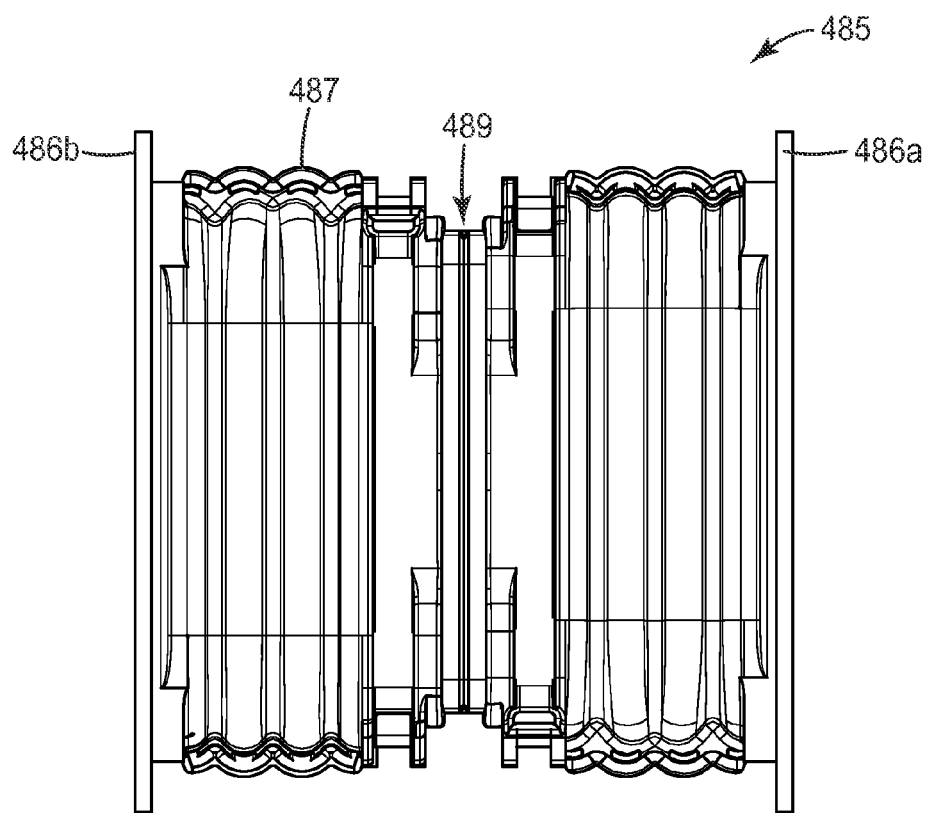
FIG. 10A is a top view of a flexible bridge device and FIG. 10B is a top view of a modified flexible bridge device according to other aspects of the invention.

As mentioned above, box 400 can have a modular structure that provides for straightforward implementation of several boxes together, depending on the application. In one aspect, in order to couple adjacent or otherwise nearby distribution boxes together in an in-line manner, box 400 can further utilize a flexible bridge device 485 shown in FIG. 8A and FIGS. 10A and 10B to link two distribution boxes to one another, even when the adjacent or nearby boxes are not perfectly aligned, due to wall mounting conditions and space issues. For example, FIGS. 9A-9C show various views of adjacent distribution boxes 400a and 400b linked together in-line by flexible bridge device 485. All identified components in FIGS. 9A-9C are consistent with those described above with reference to FIGS. 8A-8E.

Figure 10B:
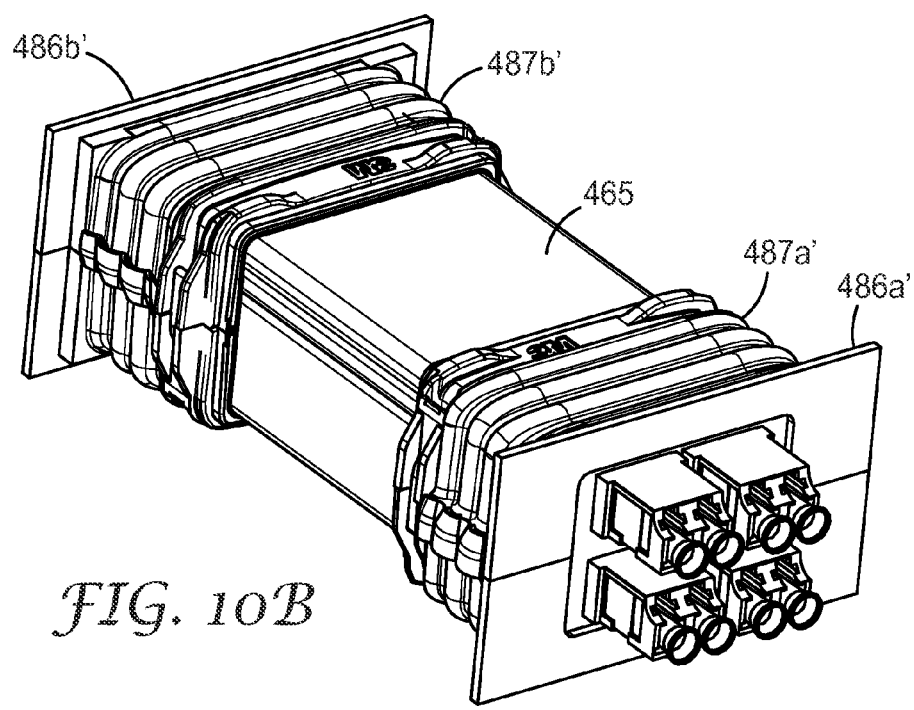

Flexible bridge device 485 includes a central aperture 484 configured to pass one or more cables therethrough. Flexible bridge device 485 can be a single or two piece structure having a ridged outer body 487 that permits limited flexibility in one or more directions. In a preferred aspect, the opposite outer edges 486a, 486b of the bridge device 485 are configured to slide into the outer wall slots of box 400 (for example, the slots occupied by any of removable walls 402a-402d). For example, as shown in FIG. 8A, bridge device 485 can be inserted into the slots utilized by removable outer wall 402c. In addition, when additional distance between adjacent distribution boxes is required, the flexible bridge device 485 can be easily modified to accommodate a standard cable channel. In one example, the center line 489 (see FIG. 10A) of the flexible bridge device 485 can be cut. As shown in FIG. 10B, a modified bridge device 485' can include two main body pieces 487a' and 487b' that are linked together by a standard cable channel 465 of an appropriate length, given the mounting conditions. Outer edge 486a' can be mounted in a first distribution box and outer edge 486b' can be mounted in a second distribution box. In another aspect, a patch panel, such as patch panel 480, can be inserted within the flexible bridge, thereby allowing an installer to make patching connections without having to fully enter the distribution box.

Figure 11:
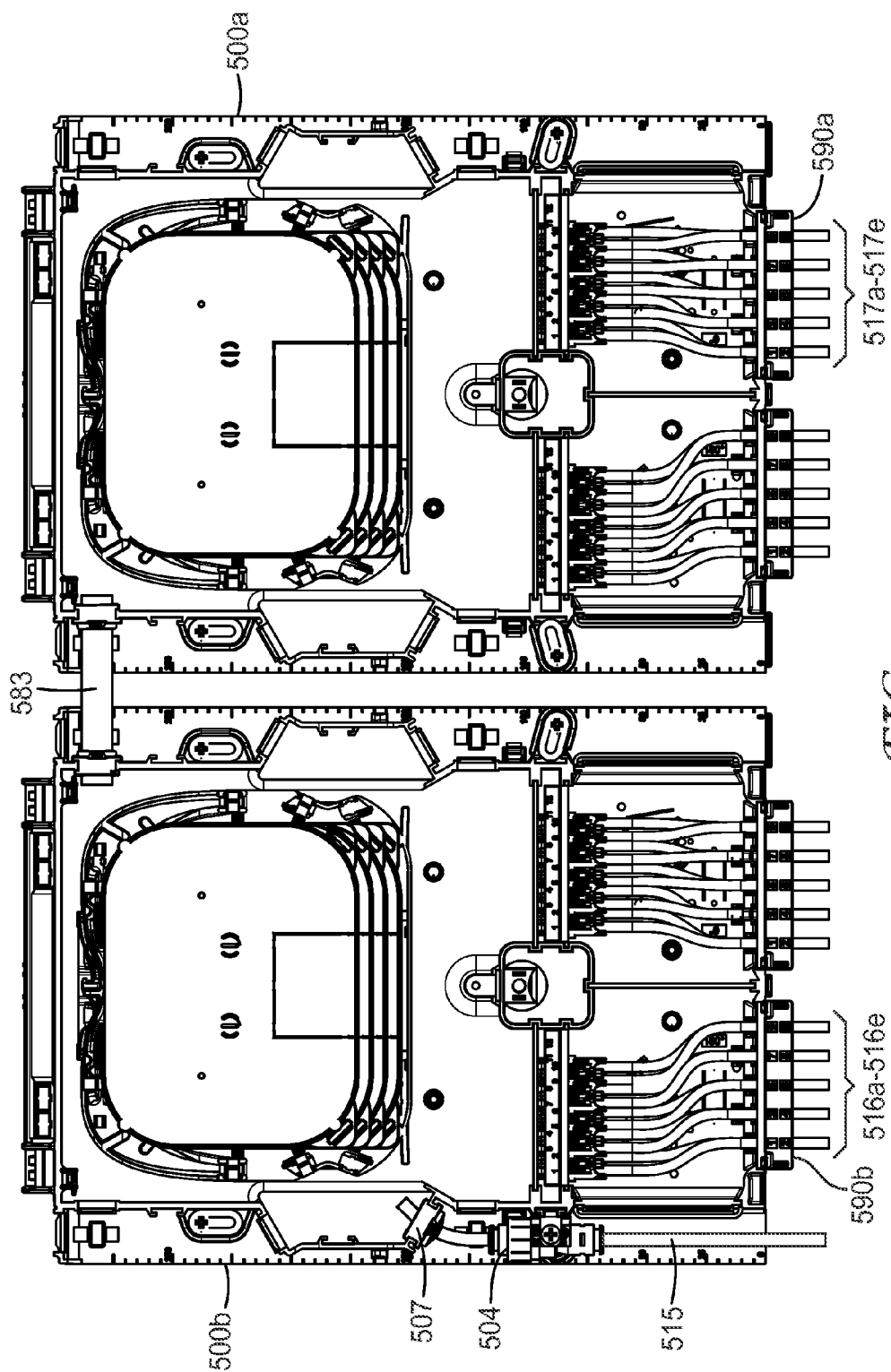
FIG. 11 is a top view of exemplary distribution boxes linked together according to another aspect of the invention.
Figure 12:
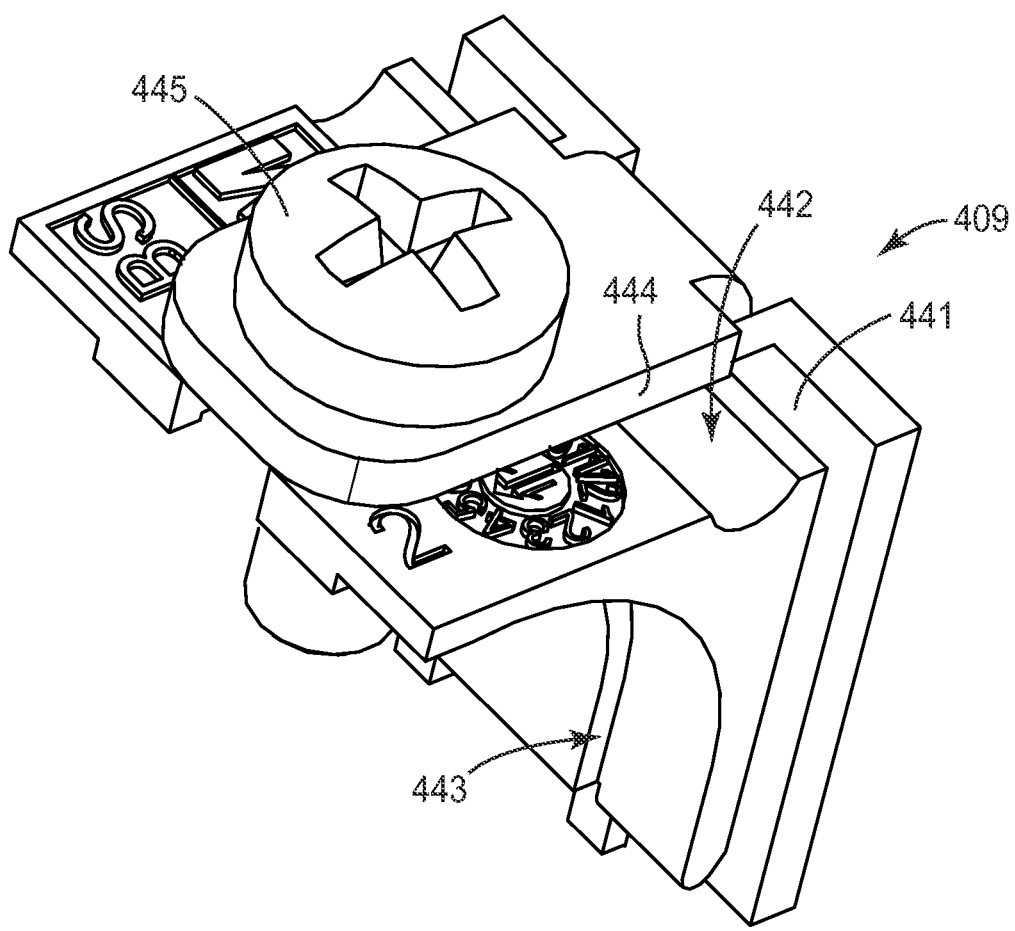
FIG. 12 is an isometric view of an exemplary universal strain relief device according to another aspect of the invention.
Figure 13A:
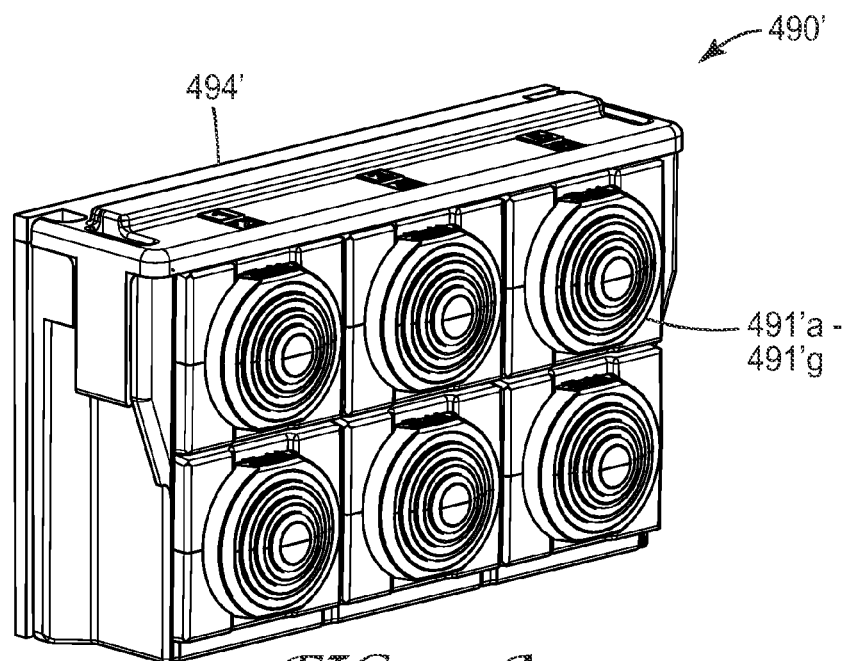
FIGS. 13A-13D are various views of a cable strain relief device array according to another aspect of the invention.
Figure 13B:
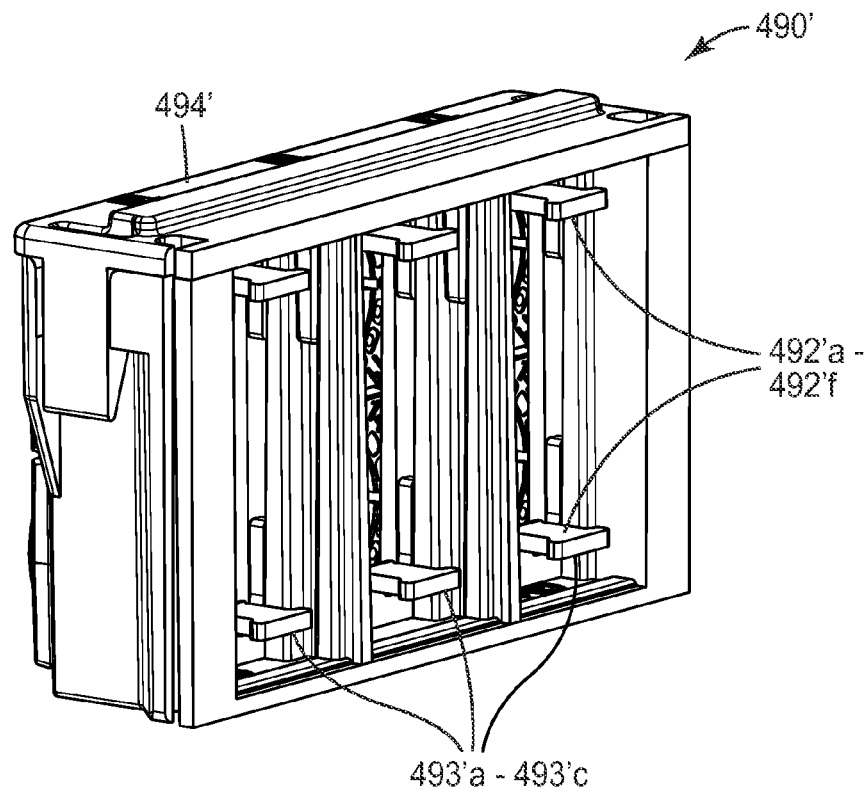
Figure 13C:
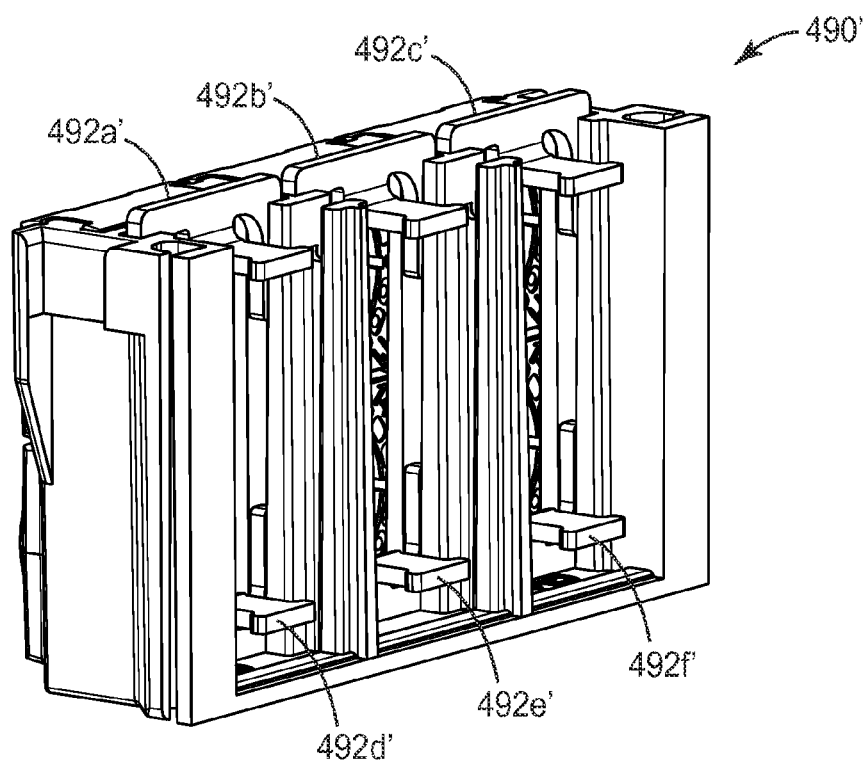
Figure 13D:
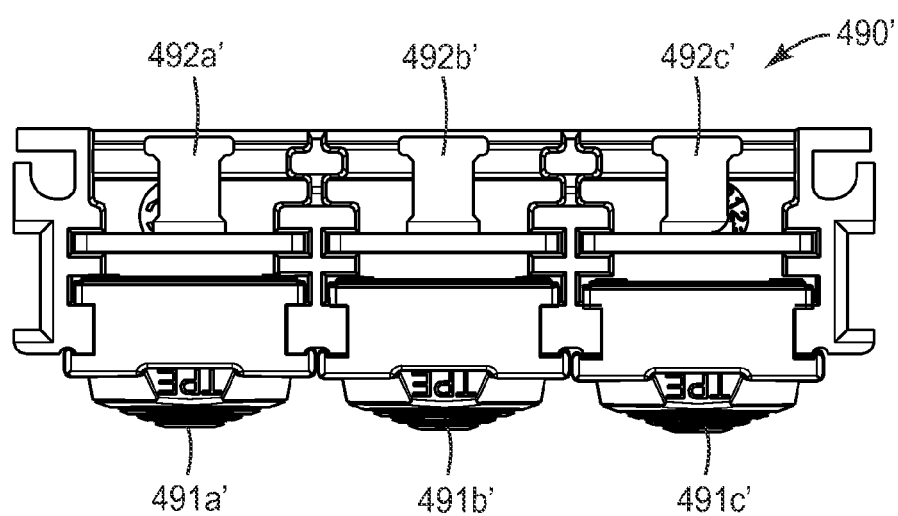
Figure 14A:
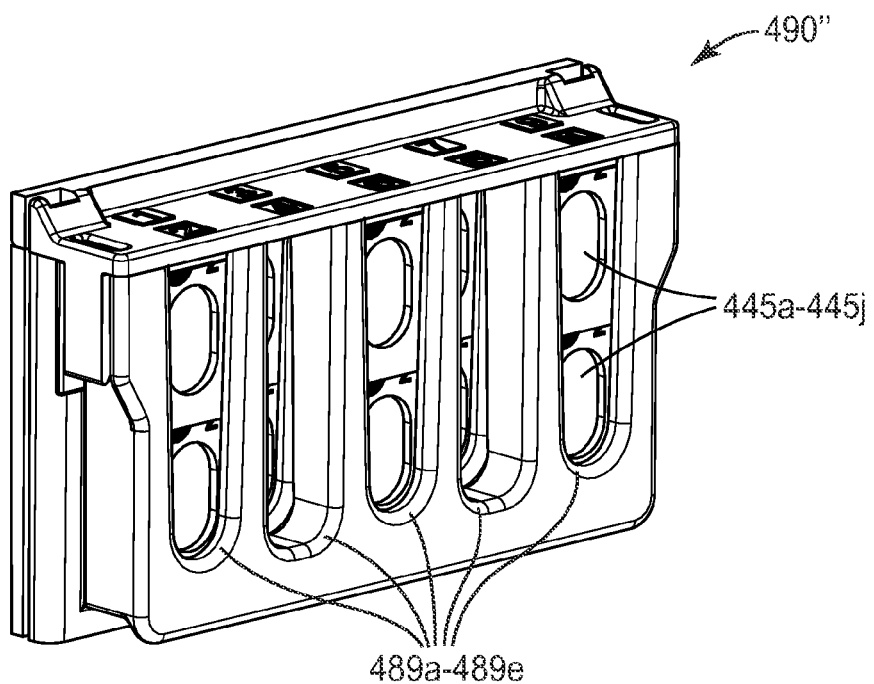
FIGS. 14A-14D are various views of another cable strain relief device array according to another aspect of the invention.
Figure 14B:
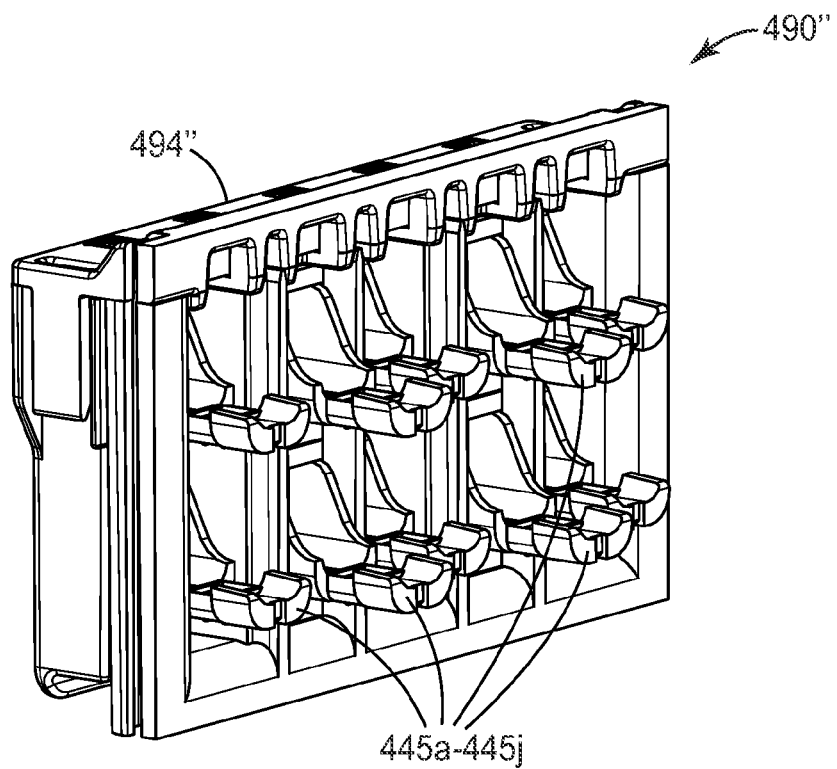
Figure 14C:
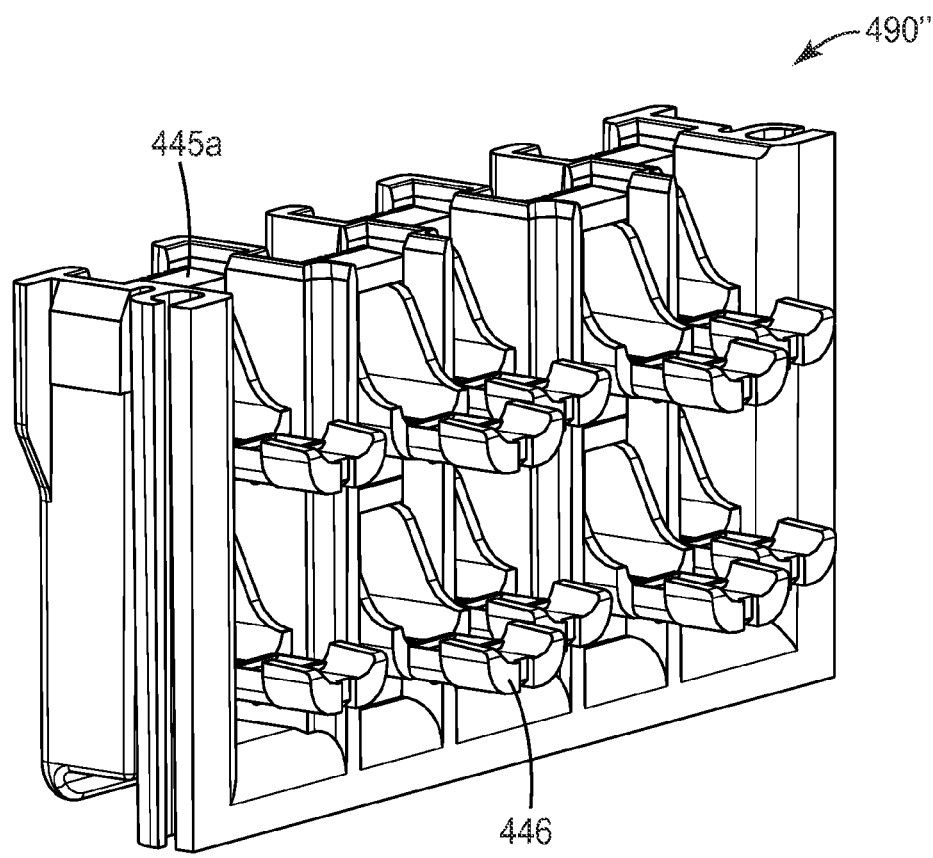
Figure 14D:
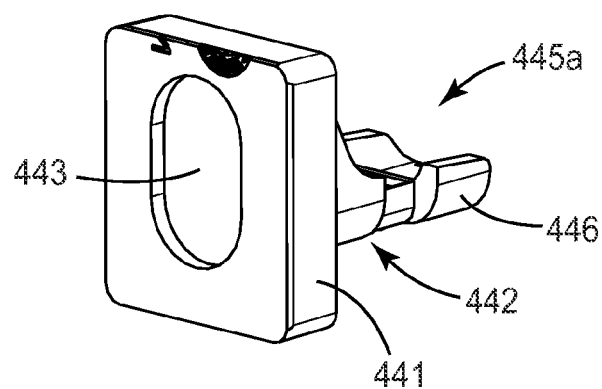

In an alternative aspect, as shown in FIG. 11, adjacent distribution boxes 500a and 500b can be cascaded together via a separate or additional coupling device, such as tube 583. In this aspect, tube 583 can be inserted into each distribution box via a grommet (such as grommet 408) or other sealing structure and provide protected passage for fibers extending from the organizer area of distribution box 500a to the organizer area of distribution box 500b. Tube 583 can be used separate from or in addition tube another bridge device, such as flexible bridge device 485 described above. In this manner, fibers from the incoming entrance riser cable 515 can be routed into both distribution box 500a and distribution box 500b. In addition, this configuration allows for a building owner to implement a splitter and connect the output fibers from a fully assembled first distribution box into a second distribution box. Moreover, the cascading configuration can be extended to a third or further additional distribution box, depending on the building requirements.

In addition, FIG. 11 shows an entrance cable 515 that includes blown optical fibers therein received by a gas-blocker device 504 entering distribution box 500b via entrance port 507. In addition, FIG. 11 shows patch or drop cables 516a-516e exiting box 500b via strain relief device array 590b. Similarly, patch or drop cables 517a-517e exit box 500a via strain relief device array 590a.

As mentioned above, cable strain relief for incoming cables, such as riser cables, can be provided via a universal strain relief device 409 mounted to the exemplary distribution boxes described herein. The universal strain relief device 409 secures the strength members (e.g., aramid, glass yarn) of the telecommunications cable(s) to the box structure. FIG. 12, shows an exemplary universal strain relief device 409 in more detail. A base 441 is configured to be slid into the distribution box at one or more different side locations of the distribution box (such as locations 454a, 454b, and/or 454c, shown in FIG. 8B, or on the opposite side of the distribution box 400) to secure the universal strain relief device 409 in place. This strain relief device is configured to secure the strength members from several different types of cable. For example, for standard cable having aramid fibers or yarn as strength members, a screw 445 is provided such that aramid fibers or yarn can be wrapped around the screw 445, then tightened. For cables having a metal rod or wire as a strength member, device 409 includes a groove formed in a upper surface that can receive the rod or wire. A plate 444 can be pressed onto the rod or wire and tightened in place by the screw 445. For cables with blown fiber, device 409 can include a central groove to receive a cable restraint device, such as a cable tie, that can be secured to the device 409.

The distribution boxes described herein can include an array of strain relief devices arranged in mounting device that can be mounted at an outer or inner wall location of the distribution box. For example, FIGS. 13A-13D show various views of a strain relief device array 490' which can provide strain relief and sealing. Strain relief device array 490' includes a main body having a plurality of slots (in this example, three slots 493a'-493c') that house cable strain relief members 492a'-492f' that can provide strain relief for up to six cables or patch cords inserted therethrough. The cable strain relief members 492a'-492f' are mounted in inner channels of the strain relief device array such that they are slidably displaceable in one direction (with respect to FIGS. 13A-13D, the cable strain relief members 492a'-492f' can be moved up and down), yet are fixed with respect to the direction of cable insertion. Cables of different sizes can be easily accommodated as the cable strain relief members 492a'-492f' can move in a direction within the device array 490'. Each of the cable strain relief members 492a'-492f' has a rigid arm or extension that can be fixed to an inserted cable via a cable tie or similar cable securing device. The cable strain relief members may be formed from a metal or polymeric material by methods such as injection molding, extrusion, casting, machining, and the like. In a preferred aspect, the cable strain relief members may be a molded plastic piece. In this aspect of the invention, the device array 490' can be inserted in the same wall slots as any inner or outer removable wall as needed.

As is also shown in FIGS. 13A-13D, the strain relief device array 490' also includes a plurality of grommets 491a'-491f' to provide sealing for the distribution box. Each of the grommets 491a'-491f' can be shaped similar to grommets 408 described above. The device array 490' can further include a cap 494 to help keep the cable strain relief members 492a'-492f' and grommets 491a'-491f' within the mounted device array.

In another alternative aspect, strain relief device array 490" is shown in detail in FIGS. 14A-14D. Strain relief device array 490" includes a plurality of slots (in this example, five slots 489a-489e) that can house a plurality of cable retention devices 445 (in this example, ten cable retention devices 445a-445j). A removable cap 494" can be used to secure the cable retention devices within slots 489a-489e of the strain relief device array 490".

Each optical fiber cable retention device 445 may be configured as a single-piece body having a body portion 442 and a base 441 attached to one terminal end of the body portion. Body portions 442 and base 441 may be formed from a metal or polymeric material by methods such as injection molding, extrusion, casting, machining, and the like. In a preferred aspect, retention device 445 may be a molded plastic piece. In this aspect of the invention, the device array 490" can be inserted in the same wall slots as any inner or outer removable wall as needed.

Body portion 442 may include a concave top surface 446 to cradle an optical fiber cable when it is installed in the retention device. Body portion 442 may include a strength member retention area on the bottom surface of the body (not shown) to position a cable securing device, such as a cable tie, which secures an optical fiber cable and the strength members to retention device 445. In addition, body portion 442 may have at least one notch adjacent to the strength member retention area to accommodate the cable securing device and provide for better connection of the cable securing device to the optical fiber cable and the retention device.

Base 441 may have a generally rectangular shape with a punch-out portion 443 generally centrally located therein. The punch-out portion 443 can be removed by a modest force to provide an opening that can accommodate several different sizes of optical fiber cable inserted therethrough, such as an outer jacket for a conventional 900 μm buffer sleeve or a 250 μm buffer sleeve fiber. The base 441 has outer edges that are configured to be slidingly received within slots 489a-489e. Base 441 may be attached to the terminal end of body portion 442 by a mechanical device such as an interference fit or by an adhesive. Alternatively, base 441 may be formed as an integral portion of retention device 445.

Thus, the modular configuration allows for many different fiber distribution applications at or within buildings, such as MDUs. Exemplary boxes 200, 400, 500 with exemplary organizer 100, 100', 300, 300', can provide termination applications for small and large fiber count telecommunications cables, where spliced pigtails can be provided at a patch panel, or lines can be split via the splitters into terminated connections. The boxes 200, 400, 500 can be utilized as building entrance boxes or building distribution boxes. End user drop lines can be coupled to the box(es) 200, 400, 500 via terminated and unterminated cables. The configuration of the box(es) 200, 400, 500 permits the use of patch panels at multiple inner and/or outer wall locations. The fiber organizer and distribution boxes described herein provide a demarcation point in the fiber network. For example, an exemplary box can be placed on an outer wall of a building, and only patchcords originating in the box are passed to the inside of the building. The boxes and organizers described herein can be used to splice incoming cables to pigtails or splitters. The exemplary organizer and distribution box can also house active electronics. Overall, the exemplary organizer and distribution box described herein can be utilized as a demarcation box, a floor distribution box, an in-house distribution box, a wireless demarcation box, or a fiber distribution box for the construction market, network termination, and media conversion.

The present embodiments also address the challenges associated with having multiple service providers access a particular building. For example, if multiple service providers are servicing one building, the distribution boxes described herein allow a first service provider to access a particular functional area of the distribution box(es) without disturbing other functional areas of the distribution box(es) (e.g., the splicing area can be locked or otherwise protected from unrestricted access, while the patch panel can be accessed. In addition, the modularity of the distribution boxes accommodates various existing building infrastructures and various existing cabling standards of different network operators.

Although specific embodiments have been illustrated and described herein for purposes of description of the preferred embodiment, it will be appreciated by those of ordinary skill in the art that a wide variety of alternate or equivalent implementations may be substituted for the specific embodiments shown and described without departing from the scope of the present invention. Those with skill in the art will readily appreciate that the present invention may be implemented in a very wide variety of embodiments. This application is intended to cover any adaptations or variations of the embodiments discussed herein.

The invention claimed is:

1. An organizer for fiber cable management, comprising:
a generally planar base having a splitter holding section, a slack and unterminated fiber storage section, and a splice and splice tray holding section,
wherein the splitter holding section is configured to optionally hold one or more fiber splitters,
wherein the slack and unterminated fiber storage section includes a slack storage region having a plurality of fiber routing structures to support and retain slack fiber and an unterminated fiber storage region having one or more spool type structures to support and retain unterminated fiber separate from the slack fiber,
wherein the splice and splice tray holding section is configured to optionally hold one of a first fiber splice insert and a splice tray holder configured to engage one or more splice trays, and
wherein the unterminated fiber storage region includes a trough formed between an outer wall of the spool-type structures and several inner retention structures, wherein the fiber storage trough is a raised structure, formed above a floor of the organizer, and wherein the unterminated fiber storage region includes one or more access slots that permit access to stored fibers from at least one side using a finger or small access tool.

2. The organizer of claim 1, wherein the plurality of fiber routing structures comprises two half ring structures that permit slack fiber to be bent at an appropriate bend radius for the fiber, wherein fiber slack is retainable outside of and inside of the half ring structures, and wherein the fiber slack storage region further includes a plurality overhanging tabs to retain the fiber slack and prevent displacement of the spooled slack fiber.

3. The organizer of claim 1, wherein the splitter holding section includes a plurality of post structures that accommodate a plurality of splitters.

4. The organizer of claim 1, wherein the splitter holding section is configured to secure a second fiber splice insert that can support one or more fiber splices.

5. The organizer of claim 1, wherein the splice and splice tray holding section is coupled to a fiber ramp deliver fibers and fiber cables, wherein the fiber ramp includes one or more fiber channels disposed on either or both sides of the splice and splice tray holding section, the fiber channels having a deep U-shaped cross section to help prevent individual fibers from crossing over into other channels.

6. The organizer of claim 1, wherein the splice and splice tray holding section is gradually elevated from the floor of the organizer, wherein the splice and splice tray holding section retains one or more splice trays in a stacked manner to sit above the slack and unterminated fiber storage section, and wherein the splice and splice tray holding section includes a removable tray holder that comprises a multi-loop structure insertable into a slot formed in the splice and splice tray holding section, the multi-loop structure configured to engage one or more rotatable splice trays.

7. A distribution box for distributing optical fibers for communications, comprising:
   a housing having a base and a cover, and
   the organizer of claim 1.

8. The distribution box of claim 7, further comprising a cable support channel formed on a first side of the distribution box to support an incoming telecommunications cable.

9. The distribution box of claim 8, wherein the cable support channel includes measurement markings.

10. The distribution box of claim 7, further comprising a patch panel to receive plurality of optical fiber connectors.

11. The distribution box of claim 7 further comprising a plurality of strain relief devices arranged in an array on an inner wall of the distribution box.

12. The distribution box of claim 7, further comprising a plurality of removable walls.

13. The distribution box of claim 7, further comprising a storage compartment for the storage of excess components and accessories.

14. The distribution box of claim 7, wherein first and second distribution boxes are attached to one another via a flexible bridge.

15. The distribution box of claim 14, further comprising a patch panel disposed within at least a portion of the flexible bridge.

16. The distribution box of claim 7, further comprising a strain relief device array that includes a main body having a plurality of slots that house a plurality of cable strain relief members that provide strain relief for a plurality of cables entering or exiting the distribution box.

17. The distribution box of claim 7, further comprising a patchcord storage device disposed in a patching area of the distribution box, the patchcord storage device having several cable routing structures configured to permit cables to be wrapped at an appropriate bend radius, wherein the patchcord storage device is rotatable to one of several fixed positions.

18. An organizer for fiber cable management, comprising:
   a generally planar base having a splitter holding section, a slack and unterminated fiber storage section, and a splice and splice tray holding section,
   wherein the splitter holding section is configured to optionally hold one or more fiber splitters,
   wherein the slack and unterminated fiber storage section includes a slack storage region having a plurality of fiber routing structures to support and retain slack fiber and an unterminated fiber storage region having one or more spool type structures to support and retain unterminated fiber separate from the slack fiber,
   wherein the splice and splice tray holding section is configured to optionally hold one of a first fiber splice insert and a splice tray holder configured to engage one or more splice trays, and
   wherein the splice and splice tray holding section is gradually elevated from the floor of the organizer, wherein the splice and splice tray holding section retains one or more splice trays in a stacked manner to sit above the slack and unterminated fiber storage section, and wherein the splice and splice tray holding section includes a removable tray holder that comprises a multi-loop structure insertable into a slot formed in the splice and splice tray holding section, the multi-loop structure configured to engage one or more rotatable splice trays.

19. A distribution box for distributing optical fibers for communications, comprising:
   a housing having a base and a cover, and
   an organizer for fiber cable management, the organizer comprising:
      a generally planar base having a splitter holding section, a slack and unterminated fiber storage section, and a splice and splice tray holding section,
      wherein the splitter holding section is configured to optionally hold one or more fiber splitters,
      wherein the slack and unterminated fiber storage section includes a slack storage region having a plurality of fiber routing structures to support and retain slack fiber and an unterminated fiber storage region having one or more spool type structures to support and retain unterminated fiber separate from the slack fiber,
      wherein the splice and splice tray holding section is configured to optionally hold one of a first fiber splice insert and a splice tray holder configured to engage one or more splice trays, and
      wherein first and second distribution boxes are attached to one another via a flexible bridge.

* * * * *